United States Patent
Tada

(10) Patent No.: US 11,595,431 B2
(45) Date of Patent: Feb. 28, 2023

(54) INFORMATION PROCESSING APPARATUS, MOVING APPARATUS, AND METHOD

(71) Applicant: SONY CORPORATION, Tokyo (JP)

(72) Inventor: Kenta Tada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 323 days.

(21) Appl. No.: 16/760,217

(22) PCT Filed: Oct. 19, 2018

(86) PCT No.: PCT/JP2018/038957
§ 371 (c)(1),
(2) Date: Apr. 29, 2020

(87) PCT Pub. No.: WO2019/093098
PCT Pub. Date: May 16, 2019

(65) Prior Publication Data
US 2020/0336495 A1    Oct. 22, 2020

(30) Foreign Application Priority Data
Nov. 8, 2017   (JP) .............................. JP2017-215250

(51) Int. Cl.
*H04L 9/40*    (2022.01)
*H04L 12/40*   (2006.01)
(52) U.S. Cl.
CPC ............ *H04L 63/145* (2013.01); *H04L 12/40* (2013.01); *H04L 63/20* (2013.01); *H04L 2012/40215* (2013.01)
(58) Field of Classification Search
CPC ........ H04L 63/145; H04L 12/40; H04L 63/20
See application file for complete search history.

(56) References Cited

U.S. PATENT DOCUMENTS 8,291,498 B1   10/2012   Liang et al.

FOREIGN PATENT DOCUMENTS

DE   102011084254 A1   4/2013
JP   2010-206698 A     9/2010
(Continued)

OTHER PUBLICATIONS

International Search Report and Written Opinion of PCT Application No. PCT/JP2018/038957, dated Jan. 15, 2019, 06 pages of ISRWO.

(Continued)

*Primary Examiner* — Matthew Smithers
*Assistant Examiner* — Shu Chun Gao
(74) *Attorney, Agent, or Firm* — Chip Law Group

(57) ABSTRACT

Efficient virus detection and removal are realized by changing a mode of collecting logs in accordance with a network usage status. A configuration includes a processing monitoring unit that executes processing of monitoring a data communication network, and the processing monitoring unit includes a system load monitoring unit that monitors an available bandwidth of a network and a virus monitoring unit that collects log information corresponding to a communication message and performs virus detection. The virus monitoring unit changes a mode of collecting log information in accordance with information regarding the available bandwidth of the network acquired by the system load monitoring unit. In a case where a virus is detected and the available bandwidth is neither equal to nor larger than a predetermined threshold, only limited log information corresponding to a high-priority communication message is collected.

20 Claims, 16 Drawing Sheets

(56) References Cited

FOREIGN PATENT DOCUMENTS

| JP | 2015-008389 A | 1/2015 | | |
|---|---|---|---|---|
| JP | 2016-110280 A | 6/2016 | | |
| WO | WO-2011083570 A1 * | 7/2011 | ....... | H04L 29/08954 |
| WO | WO-2017175158 A1 * | 10/2017 | ........... | G06F 21/552 |

OTHER PUBLICATIONS

Office Action for IN Patent Application No. 202027018104, dated Apr. 11, 2022, 05 pages of Office Action.

* cited by examiner

FIG. 5

| | PRIORITY | ECU EXAMPLE | SPECIFIC EXAMPLES OF LOG INFORMATION |
|---|---|---|---|
| (1) | FIRST PRIORITY | COMMUNICATION SYSTEM CONTROL ECU | LOG INFORMATION CORRESPONDING TO COMMUNICATION MESSAGE ISSUED BY COMMUNICATION SYSTEM CONTROL ECU THAT CONTROLS RECORDING MEDIA COMPATIBLE IF FOR USB, SD CARD, AND THE LIKE AND COMMUNICATION IF FOR Bluetooth, INTERNET, AND THE LIKE (LOG INFORMATION PREFERABLY INCLUDES CONTENTS OF COMMUNICATION MESSAGE, MESSAGE LENGTH, COMMUNICATION PERIOD, AND THE LIKE) |
| (2) | SECOND PRIORITY | DRIVE SYSTEM CONTROL ECU | LOG INFORMATION CORRESPONDING TO COMMUNICATION MESSAGE ISSUED BY DRIVE SYSTEM CONTROL ECU THAT CONTROLS ENGINE, STEERING WHEEL, ACCELERATOR, BRAKE, AND THE LIKE (LOG INFORMATION PREFERABLY INCLUDES INFORMATION THAT CAN BE USED FOR ANALYZING CONTROL SEQUENCE OF TARGET TO BE CONTROLLED (CONTENTS OF COMMUNICATION MESSAGE, COMMUNICATION SEQUENCE INFORMATION (TIME INFORMATION), AND THE LIKE) |
| (3) | THIRD PRIORITY | BODY SYSTEM CONTROL ECU | LOG INFORMATION CORRESPONDING TO COMMUNICATION MESSAGE ISSUED BY BODY SYSTEM CONTROL ECU THAT CONTROLS DISPLAY UNIT, OPENING AND CLOSING OF DOORS, AND THE LIKE (LOG INFORMATION PREFERABLY INCLUDES INFORMATION THAT CAN BE USED FOR ANALYZING CONTROL SEQUENCE OF TARGET TO BE CONTROLLED (CONTENTS OF COMMUNICATION MESSAGE, COMMUNICATION SEQUENCE INFORMATION (TIME INFORMATION), AND THE LIKE) |
| ... | ... | ... | ... |

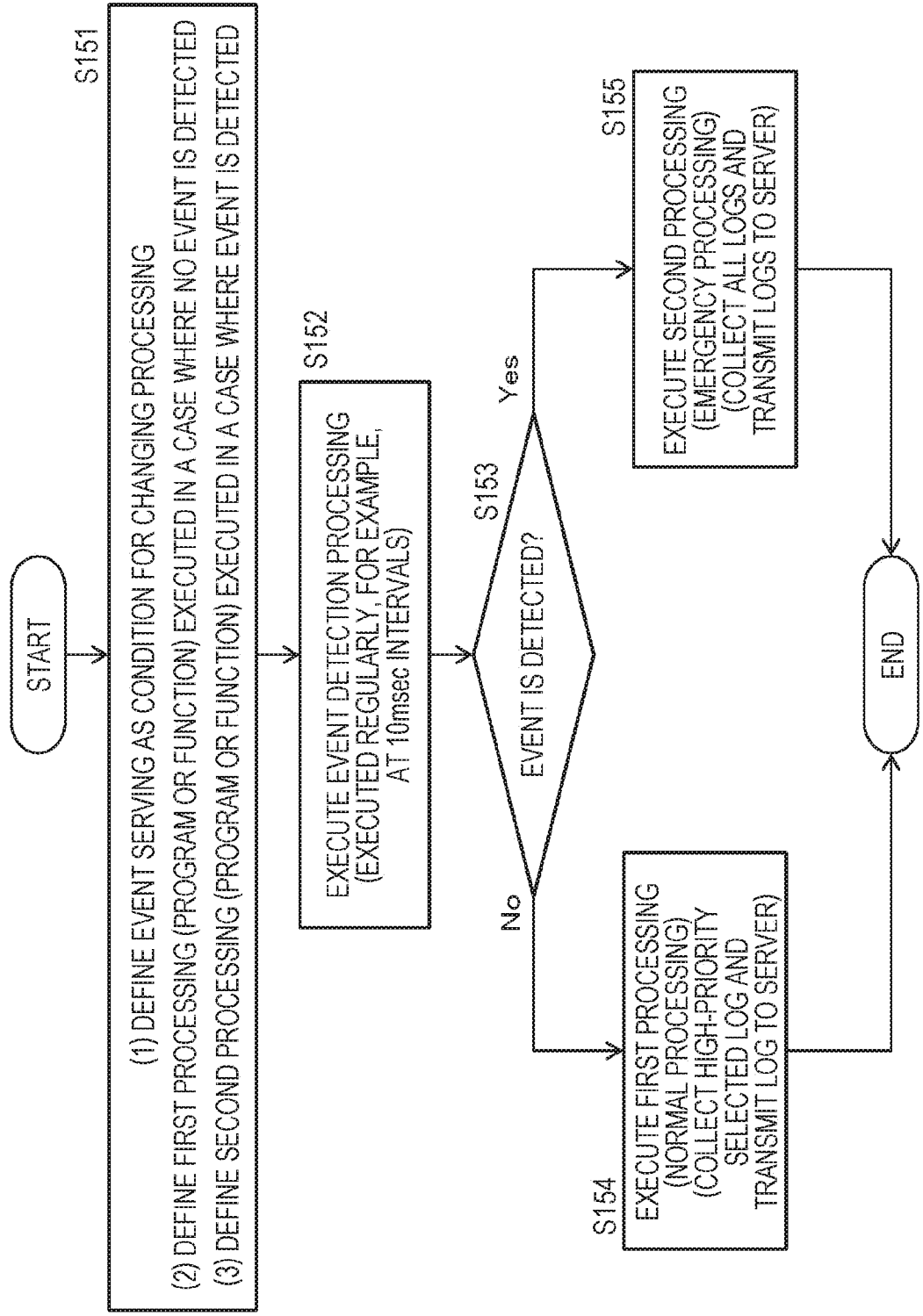

FIG. 7

(A) DEFINED EVENTS

| | EVENT | SPECIFIC EXAMPLE OF EVENT |
|---|---|---|
| (1) | FIRST EVENT | VIRUS IS DETECTED |
| (2) | SECOND EVENT | AVAILABLE BANDWIDTH OF COMMUNICATION NETWORK (CAN) IS EQUAL TO OR LARGER THAN PREDETERMINED THRESHOLD |

(B) DEFINED PROCESSING

| | PROCESSING | SPECIFIC EXAMPLE OF PROCESSING |
|---|---|---|
| (1) | FIRST PROCESSING (NORMAL PROCESSING) | COLLECT HIGH-PRIORITY SELECTED LOG AND TRANSMIT LOG TO SERVER (PROCESSING THAT IS EXECUTED IN A CASE WHERE NO EVENT IS DETECTED) |
| (2) | SECOND PROCESSING (EMERGENCY PROCESSING) | COLLECT ALL LOGS AND TRANSMIT LOGS TO SERVER (PROCESSING THAT IS EXECUTED IN A CASE WHERE EVENT IS DETECTED) |

FIG. 13

| | PRIORITY | ECU EXAMPLE | SPECIFIC EXAMPLES OF LOG INFORMATION |
|---|---|---|---|
| (1) | FIRST PRIORITY | COMMUNICATION SYSTEM CONTROL ECU | LOG INFORMATION CORRESPONDING TO COMMUNICATION MESSAGE ISSUED BY COMMUNICATION SYSTEM CONTROL ECU THAT CONTROLS RECORDING MEDIA COMPATIBLE IF FOR USB, SD CARD, AND THE LIKE AND COMMUNICATION IF FOR Bluetooth, INTERNET, AND THE LIKE (LOG INFORMATION PREFERABLY INCLUDES CONTENTS OF COMMUNICATION MESSAGE, MESSAGE LENGTH, COMMUNICATION PERIOD, AND THE LIKE) |
| (2) | SECOND PRIORITY | DRIVE SYSTEM CONTROL ECU | LOG INFORMATION CORRESPONDING TO COMMUNICATION MESSAGE ISSUED BY DRIVE SYSTEM CONTROL ECU THAT CONTROLS ENGINE, STEERING WHEEL, ACCELERATOR, BRAKE, AND THE LIKE (LOG INFORMATION PREFERABLY INCLUDES INFORMATION THAT CAN BE USED FOR ANALYZING CONTROL SEQUENCE OF TARGET TO BE CONTROLLED (CONTENTS OF COMMUNICATION MESSAGE, COMMUNICATION SEQUENCE INFORMATION (TIME INFORMATION), AND THE LIKE) |
| (3) | THIRD PRIORITY | BODY SYSTEM CONTROL ECU +PROBE CAR COMPATIBLE SENSOR (CAMERA OR THE LIKE) SYSTEM CONTROL ECU | LOG INFORMATION CORRESPONDING TO COMMUNICATION MESSAGE ISSUED BY BODY SYSTEM CONTROL ECU THAT CONTROLS IMAGING BY EACH CAMERA, DISPLAY UNIT, OPENING AND CLOSING OF DOORS, AND THE LIKE (LOG INFORMATION PREFERABLY INCLUDES INFORMATION THAT CAN BE USED FOR ANALYZING CONTROL SEQUENCE OF TARGET TO BE CONTROLLED (CONTENTS OF COMMUNICATION MESSAGE, COMMUNICATION SEQUENCE INFORMATION (TIME INFORMATION), AND THE LIKE) |
| ... | ... | ... | ... |

INFORMATION PROCESSING APPARATUS, MOVING APPARATUS, AND METHOD

CROSS REFERENCE TO RELATED APPLICATIONS

This application is a U.S. National Phase of International Patent Application No. PCT/JP2018/038957 filed on Oct. 19, 2018, which claims priority benefit of Japanese Patent Application No. JP 2017-215250 filed in the Japan Patent Office on Nov. 8, 2017. Each of the above-referenced applications is hereby incorporated herein by reference in its entirety.

TECHNICAL FIELD

The present disclosure relates to an information processing apparatus, a moving apparatus, a method, and a program. More specifically, the present disclosure relates to an information processing apparatus, a moving apparatus, a method, and a program, each of which performs monitoring of processing executed in an electronic control unit (ECU) attached to a moving apparatus such as a vehicle, prevention of occurrence of abnormalities, and the like.

BACKGROUND ART

Recent automobiles are equipped with a large number of electronic control units (ECUs) controlled by programs (software).

For example, an automobile is equipped with various different electronic control units (ECUs) such as an electronic control unit (ECU) that performs drive control of the automobile, an electronic control unit (ECU) that performs control other than control of a drive system, such as opening and closing of doors, air conditioning control, and displaying control of a display, and those electronic control units perform various kinds of processing in accordance with individual programs, respectively.

Such a plurality of ECUs is connected to each other by, for example, a controller area network (CAN) standardized as an in-vehicle network, and is configured to transmit and receive CAN messages conforming to a CAN protocol via the network.

However, the ECUs controlled by programs (software) may be illegally controlled by, for example, a virus or malicious program intruding from outside of the network.

The virus and the like may intrude at various timings from, for example, an external device, an external storage medium, or the like connected to the CAN.

Therefore, in many cases, a system including the ECUs is provided with a monitoring apparatus for performing detection of fraud and restoration processing.

The monitoring apparatus acquires, for example, log information corresponding to various kinds of processing executed in the ECUs, and performs detection of fraud, restoration, and the like on the basis of the log information.

Note that the system is also configured as follows: log information acquired by the monitoring apparatus of the vehicle is transmitted to an external server, and the server executes analysis of fraud and transmits an analysis result to the monitoring apparatus of the vehicle, and then elimination of the fraud and restoration processing are performed by using the analysis result received by the monitoring apparatus from the server.

In a case where such analysis of fraud based on log information is performed, it is necessary to collect log information corresponding to communication messages (CAN messages) transmitted and received by the ECUs connected to the network.

However, in the configuration in which the plurality of ECUs is connected to a single network, i.e., the CAN, various CAN messages are transmitted and received via the network (CAN) even in a normal state.

In a case where some special processing is further performed, more messages are transmitted and received.

When the monitoring apparatus further attempts to collect logs from each ECU while a large number of messages are being transmitted and received as described above, it is necessary to transmit and receive log messages from each ECU to the monitoring apparatus by using a limited bandwidth of the network. This reduces an available bandwidth. As a result, there arises a problem that transmission and reception of normal control messages are congested or delayed.

As a related art, for example, Patent Document 1 (Japanese Patent Application Laid-Open No. 2010-206698) discloses control performed in a case where a large amount of log information is generated.

Patent Document 1 discloses a configuration in which priority is set for log messages and, in a case where a resource load is in a high state, only high-priority log messages are selectively collected.

However, the configuration described in Patent Document 1 is a configuration in which collection of log messages is controlled only on the basis of the state of the resource load.

In a case where, in the network to which the plurality of ECUs is connected, for example, a virus is detected, it is necessary to rapidly perform processing for removing the virus and eliminating an influence of the virus.

In the configuration in which log messages are collected only on the basis of the state of the resource load described in Patent Document 1, even if a virus is detected, acquisition of log messages is restricted in a case where it is determined that the resource load is large. Thus, the configuration may fail in acquiring log messages required for virus countermeasures.

CITATION LIST

Patent Document

Patent Document 1: Japanese Patent Application Laid-Open No. 2010-206698

SUMMARY OF THE INVENTION

Problems to be Solved by the Invention

The present disclosure has been made in view of, for example, the above problems. It is therefore an object thereof to provide an information processing apparatus, a moving apparatus, a method, and a program, each of which is configured so that, in a network to which a plurality of electronic control units (ECUs) is connected, logs corresponding to messages transmitted from and received by the respective ECUs are selectively acquired in accordance with a status of a network bandwidth, and can efficiently prevent illegal processing caused by a virus or the like, without reducing a bandwidth for normal communication messages via the network.

Solutions to Problems

A first aspect of the present disclosure is
an information processing apparatus including
a processing monitoring unit configured to execute processing of monitoring a data communication network, in which:
the processing monitoring unit includes
a system load monitoring unit configured to monitor an available bandwidth of the data communication network, and
a virus monitoring unit configured to collect log information corresponding to a communication message in the data communication network and perform virus detection based on the log information; and
the virus monitoring unit
is configured to change a mode of collecting the log information in accordance with information regarding the available bandwidth of the data communication network acquired by the system load monitoring unit, and
in a case where the available bandwidth of the data communication network is neither equal to nor larger than a predetermined threshold, collects only limited log information corresponding to a high-priority communication message in accordance with predetermined priority information.

Further, a second aspect of the present disclosure is
a moving apparatus including:
a data communication network configured to transmit and receive a communication message for controlling a component of the moving apparatus; and
a processing monitoring unit configured to execute processing of monitoring the data communication network, in which:
the processing monitoring unit includes
a system load monitoring unit configured to monitor an available bandwidth of the data communication network, and
a virus monitoring unit configured to collect log information corresponding to a communication message in the data communication network and perform virus detection based on the log information; and
the virus monitoring unit
is configured to change a mode of collecting the log information in accordance with information regarding the available bandwidth of the data communication network acquired by the system load monitoring unit, and
in a case where the available bandwidth of the data communication network is neither equal to nor larger than a predetermined threshold, collects only limited log information corresponding to a high-priority communication message in accordance with predetermined priority information.

Further, a third aspect of the present disclosure is
an information processing method executed in an information processing apparatus, the method including
causing a processing monitoring unit configured to execute processing of monitoring a data communication network to execute
system load monitoring processing of monitoring an available bandwidth of the data communication network, and
virus monitoring processing of collecting log information corresponding to a communication message in the data communication network and performing virus detection based on the log information, in which
in the virus monitoring processing,
the processing monitoring unit executes processing of changing a mode of collecting the log information in accordance with information regarding the available bandwidth of the data communication network acquired by the system load monitoring unit, and
in a case where the available bandwidth of the data communication network is neither equal to nor larger than a predetermined threshold, the processing monitoring unit collects only limited log information corresponding to a high-priority communication message in accordance with predetermined priority information.

Further, a fourth aspect of the present disclosure is
a program for causing an information processing apparatus to execute information processing,
the program causing a processing monitoring unit configured to execute processing of monitoring a data communication network to execute
system load monitoring processing of monitoring an available bandwidth of the data communication network, and
virus monitoring processing of collecting log information corresponding to a communication message in the data communication network and performing virus detection based on the log information, in which
in the virus monitoring processing,
the program causes the processing monitoring unit to
execute processing of changing a mode of collecting the log information in accordance with information regarding the available bandwidth of the data communication network acquired by the system load monitoring unit, and
in a case where the available bandwidth of the data communication network is neither equal to nor larger than a predetermined threshold, collect only limited log information corresponding to a high-priority communication message in accordance with predetermined priority information.

Note that the program of the present disclosure is, for example, a program that can be provided by a storage medium or a communication medium in a computer-readable format for an information processing apparatus or a computer system capable of executing various program codes. By providing such a program in a computer-readable format, processing corresponding to the program is realized in the information processing apparatus or computer system.

Other objects, features, and advantages of the present disclosure will be apparent from more detailed description based on embodiments of the present disclosure described below and the accompanying drawings. Note that, in this specification, a system is a logical set configuration of a plurality of apparatuses, and is not limited to a configuration in which apparatuses having respective configurations are included in the same housing.

Effects of the Invention

According to a configuration of an embodiment of the present disclosure, efficient virus detection and removal are realized by changing a mode of collecting logs in accordance with a network usage status.

Specifically, for example, the configuration includes a processing monitoring unit that executes processing of monitoring a data communication network, and the processing monitoring unit includes a system load monitoring unit that monitors an available bandwidth of a network and a virus monitoring unit that collects log information corresponding to a communication message and performs virus detection. The virus monitoring unit changes a mode of collecting log information in accordance with information regarding the available bandwidth of the network acquired by the system load monitoring unit. In a case where a virus is detected and the available bandwidth is neither equal to nor larger than a predetermined threshold, only limited log information corresponding to a high-priority communication message is collected.

With this configuration, efficient virus detection and removal are realized by changing the mode of collecting logs in accordance with the network usage status.

Note that the effects described in the present specification are merely examples, are not limited, and may have additional effects.

BRIEF DESCRIPTION OF DRAWINGS

FIG. 5 shows examples of predetermined log information priority.

FIG. 6 is a flowchart showing a sequence of setting a program executed by a processing monitoring unit, defining an event, switching processing, and the like.

FIG. 7 shows a plurality of kinds of processing executed by a processing monitoring unit and specific examples of an event serving as a trigger for switching processing.

FIG. 13 shows examples of predetermined log information priority.

MODE FOR CARRYING OUT THE INVENTION

Figure 1:
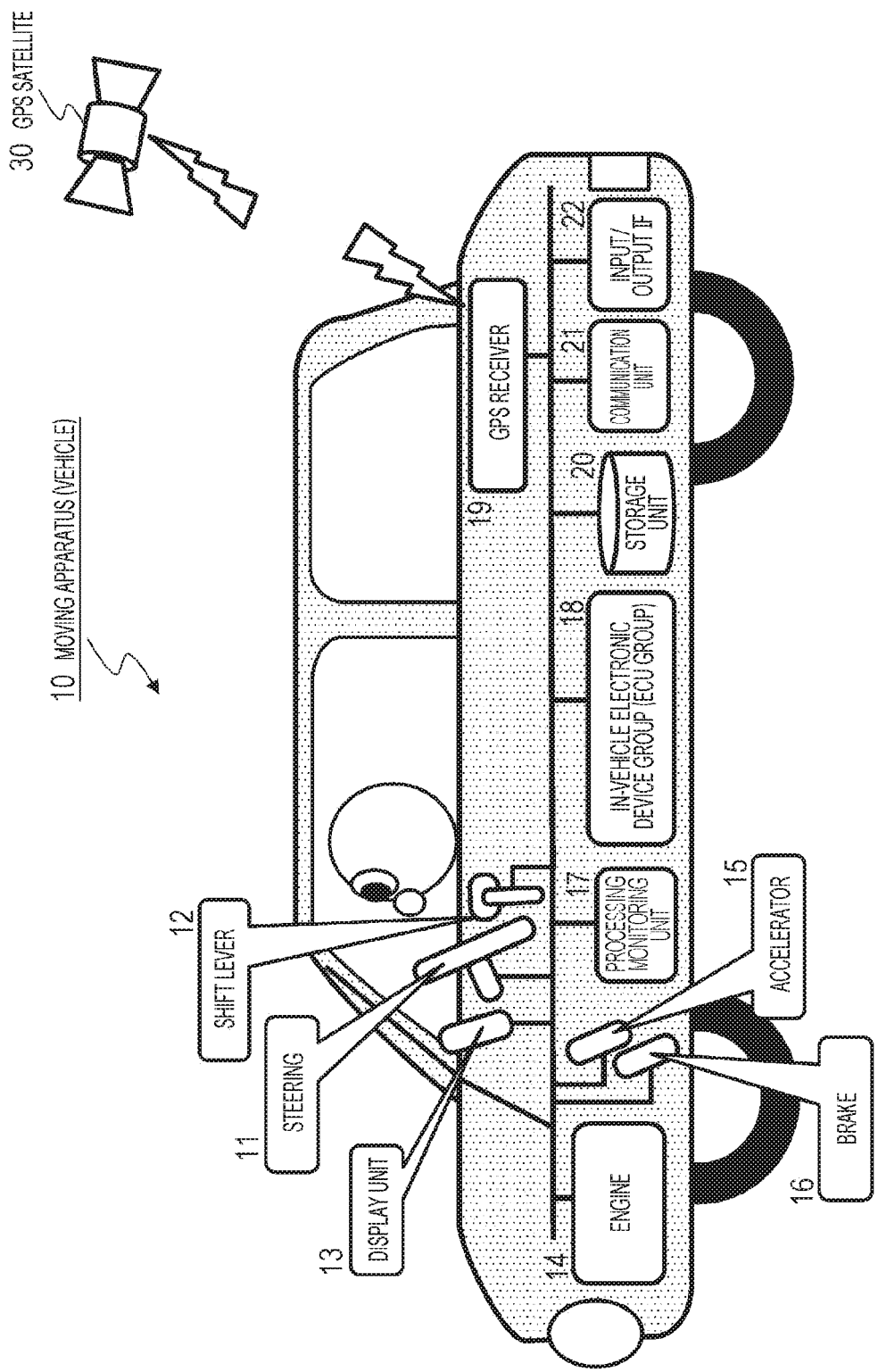
FIG. 1 shows a configuration example of a moving apparatus.

Hereinafter, details of an information processing apparatus, a moving apparatus, a method, and a program of the present disclosure will be described with reference to the drawings. Note that description will be made in accordance with the following items.

1. Configuration example of moving apparatus
2. Processing executed by processing monitoring unit
3. Configuration in which three or more kinds of processing are switched in accordance with available bandwidth of CAN network
4. Examples of log collection processing in probe car
5. Other embodiments
6. Summary of configurations of present disclosure

1. Configuration Example of Moving Apparatus

First, a configuration example of a moving apparatus will be described with reference to FIG. 1 and the like.

Note that, in the following embodiment, an embodiment in which a moving apparatus 10 is an automobile (vehicle) will be described as an example of the moving apparatus 10. However, processing of the present disclosure can be used in various moving apparatuses other than automobiles.

A configuration of the present disclosure is applicable not only to automobiles but also to, for example, various moving apparatuses such as (walking and traveling) robots, flying objects such as drones, and apparatuses that move on or in water such as ships and submarines.

FIG. 1 shows a configuration example of an automobile (vehicle) that is an example of the moving apparatus 10.

As shown in FIG. 1, the moving apparatus 10 includes a steering 11, a shift lever 12, a display unit 13, an engine 14, an accelerator 15, a brake 16, a processing monitoring unit 17, an in-vehicle electronic device group (ECU group) 18, a GPS receiver 19, a storage unit 20, a communication unit 21, and an input/output IF 22.

Note that those components are merely some main components of the moving apparatus 10, and the moving apparatus 10 includes many other components in addition to those components.

Among the components shown in FIG. 1, the in-vehicle electronic device group (ECU group) 18 includes a plurality of electronic control units (ECUs), and each ECU controls each configuration unit of the moving apparatus 10.

The ECU is connected to each component of the moving apparatus 10 by a controller area network (CAN) standardized as an in-vehicle network, and performs control by transmitting and receiving a CAN message conforming to a CAN protocol.

The ECUs in the in-vehicle electronic device group (ECU group) 18 execute, for example, various kinds of control such as drive control regarding driving of the moving apparatus 10 such as the engine 14 and the steering 11, control of display information on the display unit 13, control of opening, closing, locking, and the like of doors, and communication control in the communication unit 21.

The above control is performed by programs (software) executed by the ECUs.

The plurality of electronic control units (ECUs) included in the in-vehicle electronic device group (ECU group) 18 can be roughly classified into the following three groups:

(1) a drive system control ECU that performs drive control regarding driving of the moving apparatus 10 such as the engine 14, the steering 11, the shift lever 12, the accelerator 15, and the brake 16;

(2) a body system control ECU that performs control of a body system other than a drive system of the moving apparatus, such as control of the display unit 13, air conditioning, and opening, closing, and locking of doors; and (3) a communication system control ECU that performs control regarding the communication unit 21, the input/output IF 22, the GPS receiver 19, and the like which perform communication or input and output of data with an external device or external storage device.

Those electronic control units (ECUs) perform various kinds of processing in accordance with individual programs, respectively.

However, the ECUs controlled by programs (software) may be illegally controlled by a virus or malicious program intruding from the outside.

The virus may intrude at various timings from, for example, various wired or wireless illegal devices that illegally access the CAN from the outside.

The processing monitoring unit 17 shown in FIG. 1 is a monitoring apparatus for performing detection of such a virus and restoration processing.

The processing monitoring unit 17 acquires, for example, log information corresponding to various kinds of processing executed in the ECUs, specifically, for example, log information corresponding to communication messages transmitted and received by the ECUs, and performs detection of fraud, restoration processing, and the like on the basis of the acquired log information.

Further, the processing monitoring unit 17 transmits the acquired log information to an external server. The server executes analysis based on the log information, and transmits an analysis result to the processing monitoring unit 17. The processing monitoring unit 17 removes fraud (virus, program, or the like) and performs restoration processing by using the analysis result received from the server.

As described above, the plurality of electronic control units (ECUs) included in the in-vehicle electronic device group (ECU group) 18 controls each component of the moving apparatus 10 shown in FIG. 1. Control data for this control is transferred via the controller area network (CAN) standardized as the in-vehicle network.

The ECUs and other components connected to the CAN transmit and receive CAN messages that are communication messages conforming to the CAN protocol.

Figure 2:
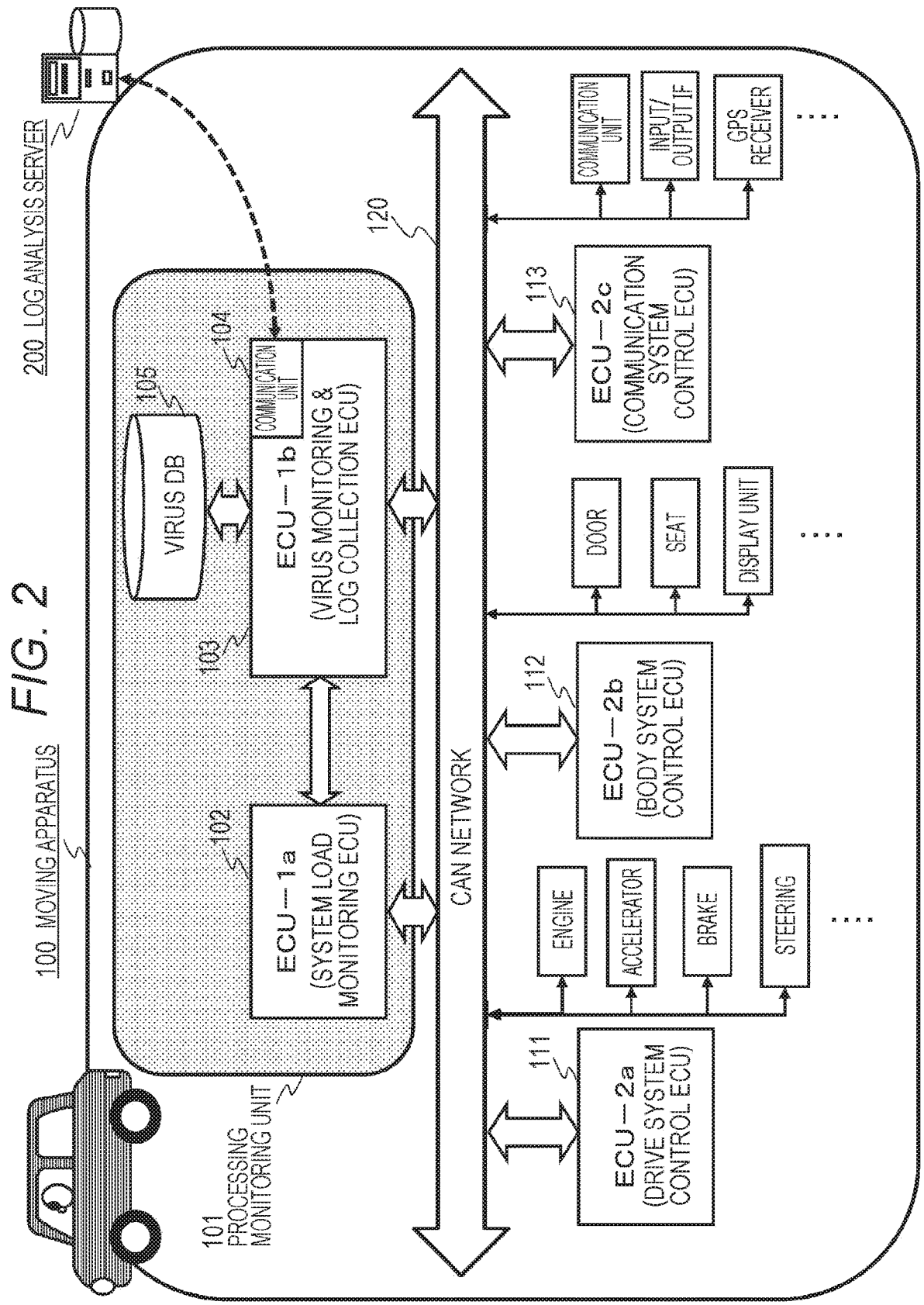
FIG. 2 shows a network configuration example of a moving apparatus.

FIG. 2 shows a network configuration example of the CAN.

A moving apparatus 100 shown in FIG. 2 includes a plurality of ECUs 102, 103, and 111 to 113 and is configured so that such a plurality of ECUs is connected to a CAN network 120 that is an in-vehicle network.

The ECUs 102 and 103 are ECUs included in a processing monitoring unit 101.

The ECUs 111 to 113 correspond to the three kinds of ECUs described above with reference to FIG. 1, i.e., the drive system control ECU, the body system control ECU, and the communication system control ECU.

Not only the ECUs but also various components to be controlled by the ECUs, i.e., an engine, an accelerator, and the like are connected to the CAN network. Those components are controlled in response to control messages generated by the ECUs in accordance with programs (software).

The ECUs perform control by generating a CAN message conforming to the CAN protocol and transmitting the message to various targets to be controlled.

The ECUs shown in FIG. 2 are the following five ECUs:

(1) an ECU-1a (system load monitoring ECU) 102;
(2) an ECU-1b (virus monitoring & log collection ECU) 103;
(3) an ECU-2a (drive system control ECU) 111;
(4) an ECU-2b (body system control ECU) 112; and
(5) an ECU-2c (communication system control ECU) 113.

"(3) The ECU-2a (drive system control ECU) 111" is a drive system control ECU that performs drive control regarding driving of the moving apparatus 100 such as an engine, a steering, a shift lever, an accelerator, and a brake.

"(4) The ECU-2b (body system control ECU) 112" is a body system control ECU that performs control of a body system other than a drive system of the moving apparatus, such as control of a display unit, air conditioning, and opening, closing, and locking of doors.

"(5) The ECU-2c (communication system control ECU) 113" is a communication system control ECU that performs control regarding a communication unit, an input/output IF, a GPS receiver, and the like which perform communication or input and output of data with an external device or external storage device.

Those ECUs 111 to 113 control each component of the moving apparatus 100 by transmitting a CAN message conforming to the CAN protocol to each component of the moving apparatus 100 via the controller area network (CAN) 120.

"(1) The ECU-1a (system load monitoring ECU) 102" and "(2) the ECU-1b (virus monitoring & log collection ECU) 103" are ECUs included in the processing monitoring unit 101.

Note that those two ECUs can also be configured as a single ECU.

"(1) The ECU-1a (system load monitoring ECU) 102" mainly monitors a communication status of the CAN network 120. Specifically, the ECU monitors a bandwidth usage status of the network.

The CAN network 120 is a path for packets such as control messages transmitted and received between the ECUs and other apparatuses connected to the network, and traffic changes depending on a situation.

For example, when the moving apparatus 100 starts moving, it is necessary to simultaneously control various devices, and the traffic (communication traffic) of the network is increased.

In addition, in a case where behavior is greatly changed or in other cases, such as when the moving apparatus 100 switches from forward to reverse, the number of control messages is increased, and the communication traffic is also increased.

"(2) The ECU-1b (virus monitoring & log collection ECU) 103" acquires log information based on a CAN message transmitted and received via the CAN network 120, i.e., a control message to each configuration unit of the moving apparatus 100, such as the engine and the accelerator, and executes virus exposing processing or the like based on the log information.

The ECU-1b (virus monitoring & log collection ECU) 103 can access a virus database (DB) 105 storing virus pattern data.

The ECU-1b (virus monitoring & log collection ECU) 103 verifies whether or not a virus having the same pattern as a virus pattern stored in the virus database (DB) 105 is included in a control message transmitted and received in the CAN network 102.

In a case where a virus is detected, antivirus processing for eliminating the virus, such as invalidating the message, is performed.

Further, the ECU-1b (virus monitoring & log collection ECU) 103 transmits the collected log information to a log analysis server 200 via a communication unit 104.

The log analysis server 200 executes a more advanced log analysis to detect a virus, a malicious program, and the like that cannot be checked only by processing of matching with virus patterns stored in the virus database 105 of the moving apparatus 100, generates detection information, countermeasure processing information, and the like, and transmits the information to the ECU-1b (virus monitoring & log collection ECU) 103.

The ECU-1b (virus monitoring & log collection ECU) 103 executes countermeasure processing such as virus removal on the basis of the virus detection information and the countermeasure processing information received from the log analysis server 200.

As described above, the processing monitoring unit 101 performs processing by using the following two ECUs:
(1) the ECU-1a (system load monitoring ECU) 102; and
(2) the ECU-1b (virus monitoring & log collection ECU) 103.

Herein, the processing monitoring unit 101 changes log information to be collected from the CAN network 120 in accordance with an increase or decrease of the traffic of the CAN network 120.

Specifically, the ECU-1a (system load monitoring ECU) 102 monitors the communication status of the CAN network 120, and, in a case where the traffic (communication usage bandwidth) of the CAN network 120 is equal to or less than a predetermined threshold, the ECU-1b (virus monitoring & log collection ECU) 103 collects log information corresponding to all communication messages from the CAN network 120 and transmits the log information to the log analysis server 200.

Note that the log information includes, for example, contents of a communication message, a message length, a communication period, communication sequence information, and the like included in the communication message in the CAN network 120.

The ECU-1b (virus monitoring & log collection ECU) 103 of the processing monitoring unit 101 acquires a communication message in the CAN network 120, and analyzes the contents of the communication message, the message length, the communication period, the communication sequence, and the like, and then transmits each piece of the above information to the log analysis server 200 as log information.

Meanwhile, in a case where the traffic (communication usage bandwidth) of the CAN network 120 is larger than the predetermined threshold, the ECU-1b (virus monitoring & log collection ECU) 103 sets log information to be acquired on the basis of communication messages in the CAN network 120 to a log corresponding to a communication message limited in accordance with predetermined priority, and transmits only the collected limited log to the log analysis server 200.

A specific example of this log collection based on the traffic will be described later in detail.

The moving apparatus 100 shown in FIG. 2 includes the plurality of ECUs, and each of those ECUs controls various targets to be controlled, e.g., targets to be controlled such as the engine and the accelerator, in accordance with programs (software). Specifically, the ECUs perform control by generating a CAN message conforming to the CAN protocol and transmitting the message to various targets to be controlled.

A general configuration example of each ECU will be described with reference to FIG. 3.

Figure 3:
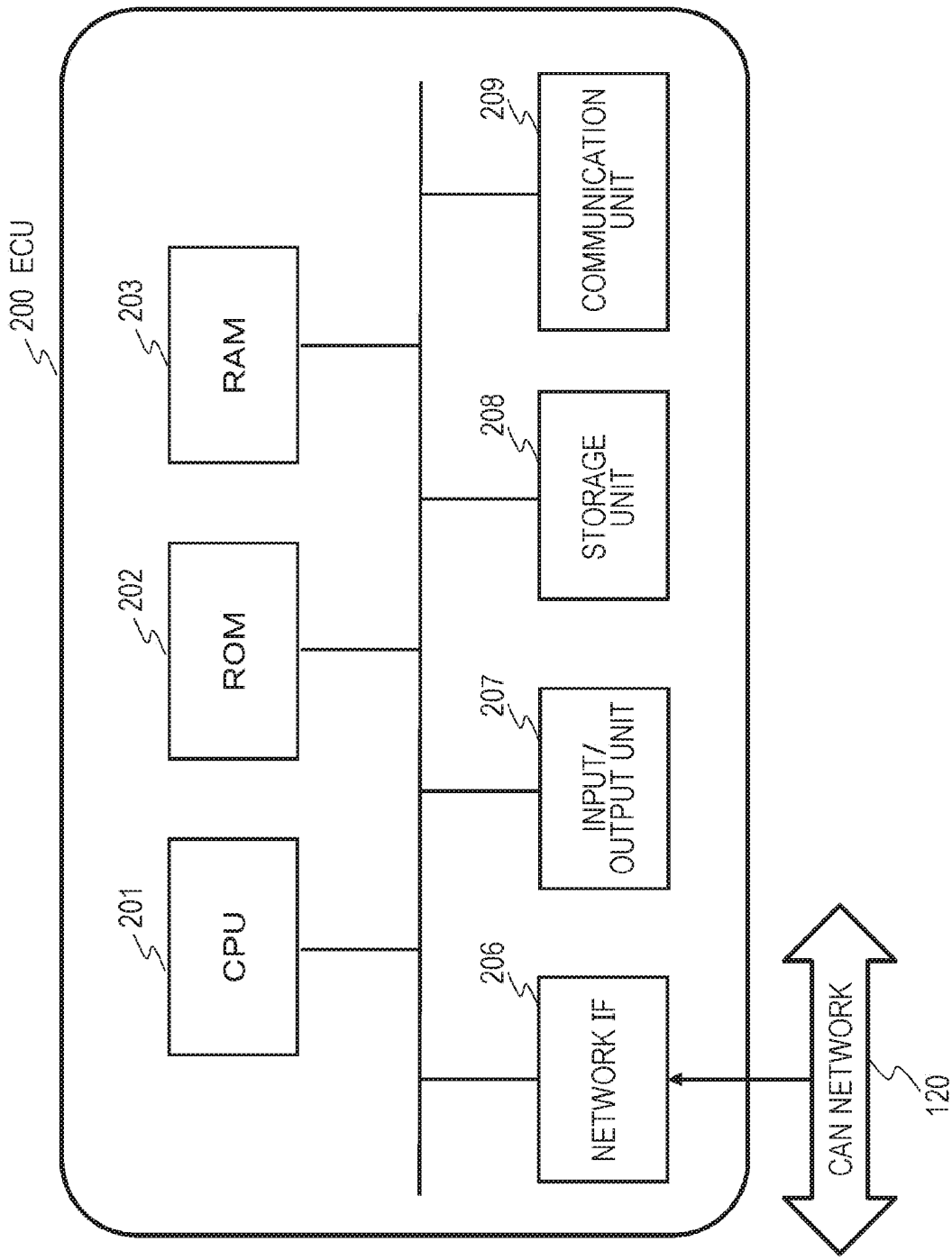
FIG. 3 shows a configuration example of an electronic control unit (ECU).

FIG. 3 shows a basic hardware configuration example of an ECU 200.

As shown in FIG. 3, the ECU 200 includes a central processing unit (CPU) 201, a read only memory (ROM) 202, a random access memory (RAM) 203, a network IF 206, an input/output unit 207, a storage unit 208, and a communication unit 209.

Note that the configuration of the ECU 200 shown in FIG. 3 is merely an example, and each ECU is not limited to the configuration shown in FIG. 3, and may have various configurations in accordance with a target to be controlled by each ECU.

The configuration of the ECU 200 shown in FIG. 3 will be described.

The CPU 201 functions as a data processing unit that executes various kinds of processing in accordance with programs stored in the ROM 202 or storage unit 208. The RAM 203 stores programs to be executed by the CPU 201, parameters, and various kinds of data. Further, the RAM 203 is also used as a work area for the programs to be executed by the CPU 201.

The network IF 206 is connected to the CAN network 120 and functions as an interface for receiving and outputting a message via the CAN network.

The input/output unit 207 is an input/output unit for allowing a user to input data or output data from the ECU. For example, the input/output unit 207 is used to change or check a program to be executed in the ECU 200, and set, change, or check parameters.

The storage unit 208 stores the programs to be executed by the CPU 201 of the ECU 200, parameters used for executing the programs, other data, and the like.

The communication unit 209 is used to communicate with, for example, an external device such as an external server.

2. Processing Executed by Processing Monitoring Unit

Next, a sequence of processing executed by the processing monitoring unit 101 included in the moving apparatus 100 shown in FIG. 2 will be described with reference to a flowchart shown in FIG. 4.

Figure 4:
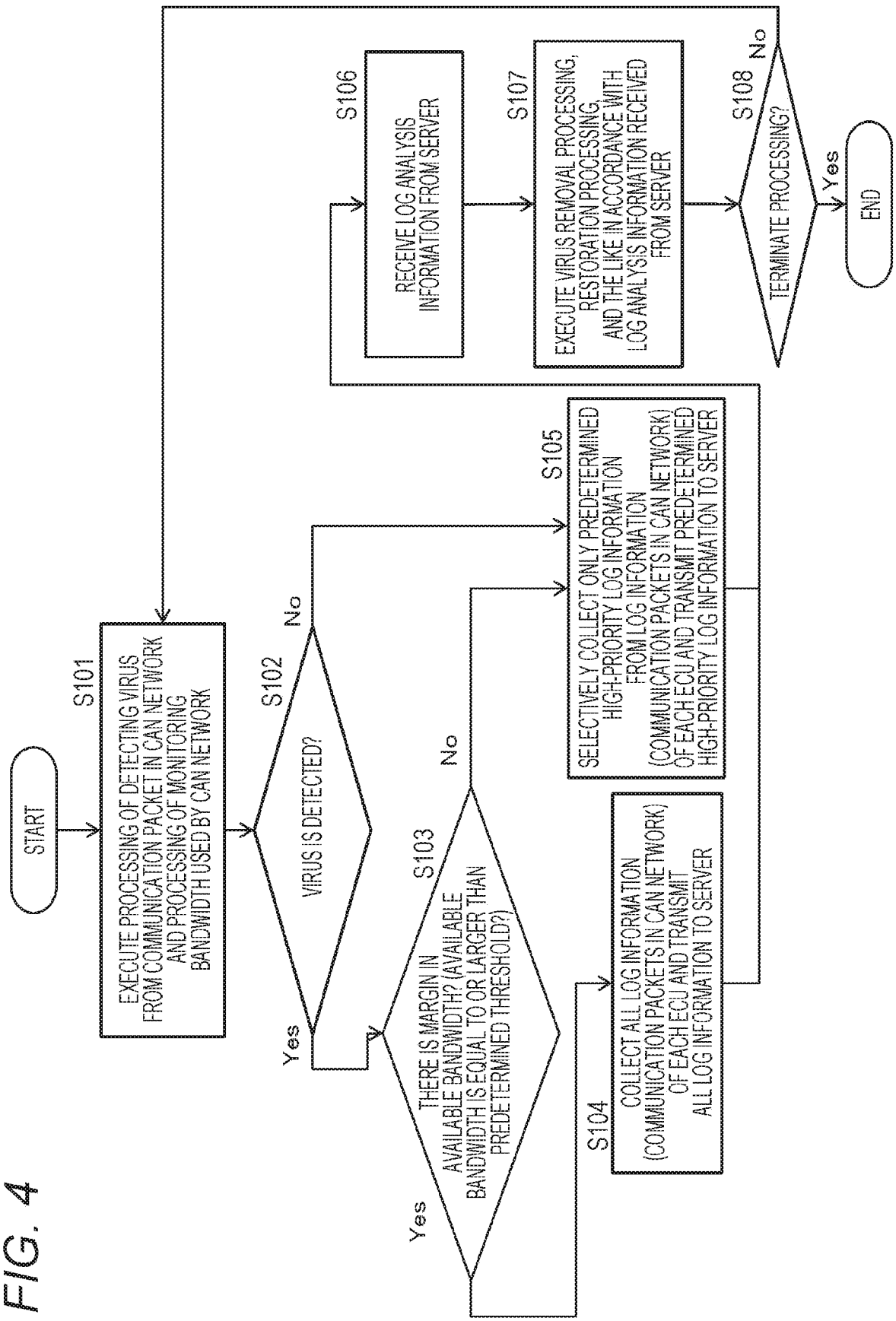
FIG. 4 is a flowchart showing a processing sequence executed by a processing monitoring unit.

FIG. 4 is a flowchart showing a processing sequence executed by the processing monitoring unit 101.

A flow shown in FIG. 4 is executed by the ECUs in the processing monitoring unit 101.

Specifically, for example, the CPUs in the ECUs execute the flow in accordance with programs stored in the storage units.

Hereinafter, processing in each step of the flowchart shown in FIG. 4 will be sequentially described.

(Step S101)

First, in step S101, the processing monitoring unit executes processing of detecting a virus from a communication packet in the CAN network and processing of monitoring a bandwidth used by the CAN network.

For example, in the configuration shown in FIG. 2, the ECU-1a (system load monitoring ECU) 102 monitors the communication status of the CAN network 120, i.e., executes the processing of monitoring the bandwidth used by the CAN network.

Further, the ECU-1b (virus monitoring & log collection ECU) 103 acquires a CAN message transmitted or received via the CAN network 120 and monitors whether or not a virus is included therein.

(Step S102)

Next, in step S102, the processing monitoring unit determines whether or not a virus is detected.

That is, the ECU-1b (virus monitoring & log collection ECU) 103 determines whether or not a virus is detected from the CAN message transmitted or received via the CAN network 120.

In a case where a virus is detected, the processing proceeds to step S103.

In a case where no virus is detected, the processing proceeds to step S105.

(Step S103)

In a case where the ECU-1b (virus monitoring & log collection ECU) 103 detects a virus from the CAN message transmitted or received via the CAN network 120 in step S102, the processing proceeds to step S103.

In step S103, the processing monitoring unit checks the traffic of the CAN network.

That is, the processing monitoring unit checks whether or not there is a margin in the available bandwidth of the CAN network.

Specifically, the ECU-1a (system load monitoring ECU) 102 monitors the communication status of the CAN network 120 and determines whether or not there is a margin in the available bandwidth of the network, i.e., whether or not the available bandwidth is equal to or larger than a predetermined threshold.

The predetermined threshold can be variously set and is set to, for example, 50% of the entire available bandwidth of the CAN network.

In step S103, it is determined whether or not the available bandwidth of the CAN network is 50% or more of the entire bandwidth.

In a case where it is determined in step S103 that the available bandwidth is equal to or larger than the predetermined threshold (50% or more) and there is a margin in the available bandwidth of the network, the processing proceeds to step S104.

Meanwhile, in a case where it is determined that the available bandwidth is less than the predetermined threshold (less than 50%) and there is no margin in the available bandwidth of the network, the processing proceeds to step S105.

(Step S104)

In a case where it is determined in the determination processing in step S103 that the available bandwidth is equal to or larger than the predetermined threshold (50% or more) and there is a margin in the available bandwidth of the network, the processing proceeds to step S104.

In step S104, the processing monitoring unit collects all log information based on communication messages (communication packets in the CAN network) issued by each ECU in the moving apparatus, and transmits the log information to the log analysis server 200.

Specifically, the ECU-1b (virus monitoring & log collection ECU) 103 of the processing monitoring unit 101 shown in FIG. 2 collects all logs corresponding to all communication messages in the CAN network 120, and transmits the collected logs corresponding to all the communication messages to the log analysis server 200.

(Step S105)

Meanwhile, in any of the following cases, the processing proceeds to step S105:

in a case where no virus is detected in the determination processing in step S102; and in a case where a virus is detected in the determination processing in step S102 and it is determined in the determination processing in step S103 that the available bandwidth is less than the predetermined threshold (less than 50%) and there is no margin in the available bandwidth of the network.

In step S105, the processing monitoring unit collects only log information corresponding to a part of communication messages (communication packets in the CAN network) issued by each ECU in the moving apparatus and transmits the log information to the log analysis server 200.

Specifically, the ECU-1b (virus monitoring & log collection ECU) 103 of the processing monitoring unit 101 shown in FIG. 2 sets logs to be collected from communication messages in the CAN network 120 only to logs corresponding to communication messages that are limited in accordance with predetermined priority, and transmits only the collected logs corresponding to the limited messages to the log analysis server 200.

Note that, in a case where the processing in step S105 is executed, the processing monitoring unit 101 needs to limit logs to be collected in accordance with the predetermined priority. The processing monitoring unit 101 holds, in the ECU, a priority list in which predetermined priority information is registered, and performs log acquisition processing in accordance with the held list.

An example of setting a log information priority list held in the processing monitoring unit 101 will be described with reference to FIG. 5.

As shown in FIG. 5, log information priority is set in accordance with, for example, a system of the ECU that issues a communication message.

FIG. 5 shows the following three kinds of priority for respective ECU systems:

first priority=a communication message issued by the communication system control ECU;

second priority=a communication message issued by the drive system control ECU; and third priority=a communication message issued by the body system control ECU.

The communication system control ECU to which the first priority is set corresponds to the ECU-2c (communication system control ECU) 113 shown in FIG. 2. The ECU-2c (communication system control ECU) 113 is a communication system control ECU that performs control regarding a communication unit, an input/output IF, a GPS receiver, and the like which perform communication or input and output of data with an external device or external storage device.

The external device, the external storage device, and the like serving as targets to be controlled by the communication system control ECU are likely to be a path through which a virus or malicious program intrudes.

Therefore, in a case where a virus or malicious program intrudes from the outside, first, the virus or malicious program is likely to be embedded in a communication message issued by the communication system control ECU.

For this reason, a log corresponding to a communication message issued by the communication system control ECU is set to be a log to be collected and analyzed with the highest priority (first priority).

Note that the log information collected by the ECU-1b (virus monitoring & log collection ECU) 103 of the processing monitoring unit 101 shown in FIG. 2 and transmitted to the log analysis server 200 may be a communication message in the CAN network 120, and the log information corresponding to the communication system control ECU having the first priority preferably includes contents of the communication message, the message length, the communication period, and the like.

When the above information is included therein, virus analysis can be efficiently executed.

The ECU-1b (virus monitoring & log collection ECU) 103 of the processing monitoring unit 101 acquires a communication message in the CAN network 120, and analyzes the contents of the communication message, the message length, and the communication period, and then transmits each piece of the above information to the log analysis server 200 as log information.

The drive system control ECU to which the second priority is set corresponds to the ECU-2a (drive system control ECU) 111 shown in FIG. 2. The ECU-2a (drive system control ECU) 111 is a drive system control ECU that performs drive control regarding driving of the moving apparatus 100 such as the engine, the steering, the shift lever, the accelerator, and the brake.

The drive system control ECU is an ECU that performs control regarding driving of the moving apparatus 100, and causes a serious problem if erroneous processing is performed due to a virus or the like.

For this reason, a log corresponding to a communication message issued by the drive system control ECU is set to be a target to be collected and analyzed with the second priority.

Note that the log information collected by the ECU-1b (virus monitoring & log collection ECU) 103 of the processing monitoring unit 101 shown in FIG. 2 and transmitted to the log analysis server 200 may be a communication message in the CAN network 120, and the log information corresponding to the drive system control ECU having the second priority preferably includes information that can be used for analyzing a control sequence of a target to be controlled, such as, for example, the contents of the communication message, the communication sequence information (time information), and the like.

When the above information is included therein, virus analysis in a drive system control message can be efficiently executed.

For example, in a case where a normal control sequence of a drive system target to be controlled (engine or the like) is A→B→C, there is a possibility that an abnormal control sequence is set to, for example, A→C→D when the drive system target to be controlled is infected with a certain virus.

In order to detect an abnormality in the control sequence as described above, the log information corresponding to the drive system control ECU preferably includes information that can be used for analyzing the control sequence of the target to be controlled, such as, for example, the contents of the communication message, the communication sequence information (time information), and the like.

The ECU-1b (virus monitoring & log collection ECU) 103 of the processing monitoring unit 101 acquires a communication message in the CAN network 120, and also acquires information that can be used for analyzing a control sequence of a target to be controlled, and then transmits information including the communication message and the sequence information to the log analysis server 200 as log information.

The body system control ECU to which the third priority is set corresponds to the ECU-2b (body system control ECU) 112 shown in FIG. 2. The ECU-2b (body system control ECU) 112 is a body system control ECU that performs control of a body system other than the drive system of the moving apparatus, such as control of a display unit, air conditioning, and opening, closing, and locking of doors.

The body system control ECU is an ECU that performs control regarding parts other than the parts regarding driving of the moving apparatus 100, and is unlikely to affect driving of the moving apparatus 100 even if erroneous processing is performed due to a virus or the like.

For this reason, a log corresponding to a communication message issued by the body system control ECU is set to be a target to be collected and analyzed with the third priority.

Note that the log information collected by the ECU-1b (virus monitoring & log collection ECU) 103 of the processing monitoring unit 101 shown in FIG. 2 and transmitted to the log analysis server 200 may be a communication message in the CAN network 120, and the log information corresponding to the body system control ECU having the third priority also preferably includes information that can be used for analyzing a control sequence of a target to be controlled, such as, for example, the contents of the communication message, the communication sequence information (time information), and the like.

When the above information is included therein, virus analysis in a drive system control message can be efficiently executed.

The ECU-1b (virus monitoring & log collection ECU) 103 of the processing monitoring unit 101 acquires a communication message in the CAN network 120, and also acquires information that can be used for analyzing a control sequence of a target to be controlled, and then transmits information including the communication message and the sequence information to the log analysis server 200 as log information.

Note that the example of setting priority of the log information shown in FIG. 5 is merely an example, and other various priority settings can be performed.

The ECU-1b (virus monitoring & log collection ECU) 103 of the processing monitoring unit 101 shown in FIG. 2 stores, for example, the list showing the priority of the log information (acquired-log priority list) shown in FIG. 5 in the storage unit in the ECU.

Note that specific examples of the priority list encompass, for example, a list including association data between priority identifiers and IDs of CAN messages or IDs indicating transmission sources or transmission destinations of messages, and the like.

The ECU-1b (virus monitoring & log collection ECU) 103 acquires bandwidth information of the CAN network 120 acquired by the ECU-1a (system load monitoring ECU) 102 in the processing in step S103, and determines whether or not a log to be acquired is limited to a high-priority log on the basis of the acquired bandwidth information.

Step S105 is processing performed in a case where it is determined in the band determination processing in step S103 that the available bandwidth is less than the predetermined threshold and there is a small margin in the remaining available communication bandwidth. In the processing, only a log corresponding to a message having high priority is selectively collected and is transmitted to the log analysis server 200.

Specifically, for example, only logs corresponding to communication messages generated by the communication system control ECU having the first priority and the drive system control ECU having the second priority shown in FIG. 5 are selectively collected, and only the selectively collected logs are transmitted to the log analysis server 200.

Note that setting of a high-priority log to be selected can be variously performed.

For example, only a log of the communication system control ECU having the first priority shown in FIG. 5 can also be set to a target to be selected.

Further, in the example of setting priority shown in FIG. 5, targets to be controlled by the ECUs are used as priority classification information as follows:

the first priority=a communication message issued by the communication system control ECU;

the second priority=a communication message issued by the drive system control ECU; and the third priority=a communication message issued by the body system control ECU.

Further, for example, a communication message generated by the drive system control ECU may be classified for each target to be controlled (engine, accelerator, or the like), and priority of the individual target to be controlled may be set.

In a case of such a priority setting, it is also possible to select not only logs of the communication system control ECU having the first priority shown in FIG. 5 but also a part of logs of the drive system control ECU having the second priority, such as, for example, only a log corresponding to a message for controlling the engine, as a target to be collected, analyzed, and transmitted to the server.

Further, the bandwidth usage status is further subdivided as follows, for example:

(a) a large amount of available bandwidth: bandwidth load (used bandwidth)=20% or less;

(b) a medium amount of available bandwidth: bandwidth load (used bandwidth)=20% to 40%; and (c) a small amount of available bandwidth: bandwidth load (used bandwidth)=40% or more.

As described above, which of the above three kinds the bandwidth usage status corresponds to may be determined, and log information to be collected may be changed in accordance with priority on the basis of the determination result.

A specific processing example of the above case will be described later.

(Step S106)

When the processing monitoring unit 101 completes the processing of collecting all or a part of the log information (communication packets in the CAN network) of each ECU in the moving apparatus and transmitting the log information to the log analysis server 200 in step S104 or step S105, then the processing monitoring unit 101 receives log analysis information from the log analysis server 200 in step S106.

The log analysis server 200 executes an advanced log analysis to detect a virus, a malicious program, and the like that cannot be checked only by processing of matching with virus patterns stored in the virus database 105 of the moving apparatus 100, generates detection information, countermeasure processing information, and the like, and transmits the information to the ECU-1b (virus monitoring & log collection ECU) 103 of the processing monitoring unit 101.

(Step S107)

Next, in step S107, the ECU-1b (virus monitoring & log collection ECU) 103 of the processing monitoring unit 101 executes countermeasure processing such as virus removal on the basis of the virus detection information and the countermeasure processing information received from the log analysis server 200.

(Step S108)

Next, in step S108, whether to terminate the processing is determined. In a case where the processing is not terminated, the processing returns to step S101, and the processing of detecting a virus from a communication packet in the CAN network and the processing of monitoring the bandwidth used by the CAN network are continuously executed.

Meanwhile, for example, in a case where movement of the moving apparatus 100 is stopped and a power supply is turned off, it is determined in step S108 that the processing is terminated, and the processing is terminated.

As can be understood from the processing shown in the flowchart in FIG. 4 described above, the processing monitoring unit 101 executes the following two kinds of processing while switching those two kinds of processing in accordance with a situation.

(First processing (normal processing)) processing of collecting only a high-priority log and transmitting the log to the server.

(Second processing (emergency processing)) processing of collecting all logs and transmitting the logs to the server.

The above two different kinds of processing are executed while being switched in accordance with the situation.

A program for performing this switching of processing, i.e., a program executed by the ECUs 102 and 103 in the processing monitoring unit 101 needs to be a program that allows the above two different kinds of processing to be executed while being switched in accordance with the situation.

Further, the program executed by the ECUs 102 and 103 in the processing monitoring unit 101, i.e., a program for monitoring viruses and collecting logs is executed with higher priority than programs (user programs) executed by the other ECUs.

Further, the program for monitoring viruses and collecting logs, which is executed by the ECUs 102 and 103 in the processing monitoring unit 101, can dynamically change a log acquisition mode between, for example, the (first processing (normal processing)) and the (second processing (emergency processing)) described above, in order to monitor an abnormal state and acquire a necessary log in accordance with the situation.

In order to dynamically change this log acquisition, it is necessary to set a program or function for detecting an observation status of the CAN network, i.e., an event observable by the program and switching the processing in accordance with the detected event, and it is also necessary to define an event that triggers switching of the processing.

Such processing of setting a program and processing of defining an event executed in the processing monitoring unit 101, switching of processing based on execution of the set program, and an example of a series of the above processing sequence will be described with reference to a flowchart shown in FIG. 6.

Hereinafter, processing in each step of the flowchart shown in FIG. 6 will be sequentially described.

(Step S151)

Processing in step S151 is processing for defining an event that triggers switching of the processing and defining processing (program, function, or the like) for executing different kinds of processing in accordance with detection of the event.

The above processing can be executed by the user.

Specifically, the following processing is performed:

(1) defining an event serving as a condition for changing the processing;

(2) defining the first processing (program or function) executed in a case where no event is detected; and (3) defining the second processing (program or function) executed in a case where an event is detected.

This processing in step S101 is performed by, for example, the user setting and changing a program executed in the ECUs, i.e., the ECU-1a (system load monitoring ECU) 102, and the ECU-1b (virus monitoring & log collection ECU) 103 in the processing monitoring unit 101 of the moving apparatus 100 shown in FIG. 2 and functions and parameters used in the program.

The user can set and change the program executed in the ECUs and the functions and parameters used in the program via the input/output units 207 of the ECUs 200 described above with reference to FIG. 3.

The programs and functions defined by the user in the above (1) to (3) are stored in the storage units of the ECUs in the processing monitoring unit of the moving apparatus 100 shown in FIG. 2.

Specific examples of the processing executed by the processing monitoring unit and the event that triggers switching of the processing will be described with reference to FIG. 7.

FIG. 7 shows specific examples of the above events (1) to (3), the first processing (normal processing), and the second processing (emergency processing).

FIG. 7(A) shows examples of the event serving as the condition for changing the processing.

The examples in FIG. 7(A) show the following two types of events:

a first event=a virus is detected; and a second event=the available bandwidth of the communication network (CAN) is equal to or larger than the predetermined threshold.

The program executed by the processing monitoring unit 101 detects the above two events.

Further, the processing monitoring unit 101 executes one of the following processing defined in FIG. 7(B) depending on whether or not the event is detected:

the first processing (normal processing)=processing of collecting a high-priority selected log and transmitting the log to the server, which is executed in a case where no event is detected; and the second processing (emergency processing)=processing of collecting all logs and transmitting the logs to the server, which is executed in a case where an event is detected.

In step S151, (1) the event serving as the condition for changing the processing, (2) the first processing (program or function) that is executed in a case where no event is detected, and (3) the second processing (program or function) that is executed in a case where an event is detected are defined as described above.

Note that, in the example shown in FIG. 7, the following two events are set as an event that triggers a change of the log acquisition mode:

the first event=a virus is detected; and a second event=the available bandwidth of the communication network (CAN) is equal to or larger than the predetermined threshold.

However, other various events can be set.

For example, detection of a system load exceeding the threshold, detection of an error log, detection of a CAN network attack message, and the like can also be set as the event.

It is possible to set the change of the log collection mode by using occurrence of those various events as a trigger. Further, the above setting and changing of the event can be performed by the user.

Further, processing that is changed in accordance with detection of the event, i.e., a program, a program code, and the like can also be set and changed by the user.

Referring back to the flow in FIG. 6, processing in and after step S152 will be described.

(Step S152)

The processing in and after step S152 is processing to which the event and processing (program or function) defined in step S151 are applied.

First, in step S152, event detection processing is executed.

This event detection processing is performed at fixed time intervals, for example, at 10 msec intervals.

The following two events defined in step S151 are events to be detected:

a first event=a virus is detected; and a second event=the available bandwidth of the communication network (CAN) is equal to or larger than the predetermined threshold.

The first event is detected by the ECU-1b (virus monitoring & log collection ECU) 103 of the processing monitoring unit 101 in the configuration shown in FIG. 2.

The ECU-1b (virus monitoring & log collection ECU) 103 detects the first event by executing the processing of detecting a virus from a CAN message transmitted and received via the CAN network 120.

The second event is detected by the ECU-1a (system load monitoring ECU) 102 of the processing monitoring unit 101 in the configuration shown in FIG. 2.

The ECU-1a (system load monitoring ECU) 102 monitors the communication status of the CAN network 120 and determines whether or not there is a margin in the available bandwidth of the network, i.e., whether or not the available bandwidth is equal to or larger than the predetermined threshold.

In step S152, those two events, i.e., the first event=a virus is detected, and a second event=the available bandwidth of the communication network (CAN) is equal to or larger than the predetermined threshold.

are detected.

(Step S153)

The processing in step S153 is an event detection result determination step of the event detection processing in step S152.

In a case where only one of the above two events, i.e., the first event=a virus is detected, and a second event=the available bandwidth of the communication network (CAN) is equal to or larger than the predetermined threshold.

is detected or neither of the two events is detected, the determination processing in step S153 is No, and the processing proceeds to step S154.

Meanwhile, in a case where both the above two events are detected, the determination processing in step S153 is Yes, and the processing proceeds to step S155.

(Step S154)

In a case where neither of the above two events is detected or only one of the two events is detected, the determination processing in step S153 is No, and the processing proceeds to step S154.

In step S154, the first processing (normal processing) is executed.

That is, the following first processing (normal processing) described with reference to FIG. 7 is executed:

the first processing (normal processing)=processing of collecting a high-priority selected log and transmitting the log to the server, which is executed in a case where no event is detected; and (Step S155)

Meanwhile, in a case where both the above two events are detected, the determination processing in step S153 is Yes, and the processing proceeds to step S155.

In step S155, the second processing (emergency processing) is executed.

That is, the following second processing (emergency processing) described with reference to FIG. 7 is executed:

the second processing (emergency processing)=processing of collecting all logs and transmitting the logs to the server, which is executed in a case where an event is detected.

As described above, the processing monitoring unit 101 shown in FIG. 2 executes the processing according to the definition of the event and program shown in FIG. 6.

Note that, as described above, the program executed by the ECUs 102 and 103 in the processing monitoring unit 101, i.e., the program for monitoring viruses and collecting logs is executed with higher priority than programs (user programs) executed by the other ECUs.

Note that a configuration for executing the program for monitoring viruses and collecting logs with higher priority than other programs can be variously formed. For example, there is a configuration using a program having a kernel space monitoring function.

That is, the program executed by the ECUs 102 and 103 in the processing monitoring unit 101, i.e., the program for monitoring viruses and collecting logs is set as a program having a kernel space monitoring function.

A kernel space is an address space used by a program (kernel) having higher priority than the user program (program executed by the ECUs), and the program having the kernel space monitoring function is executed with higher priority than the user program (program executed by the ECUs) that uses another user space as the address space.

By using the program executed by the ECUs 102 and 103 in the processing monitoring unit 101 as the program having the kernel space monitoring function, a change in processing based on monitoring of the event and occurrence of the event is performed.

With this setting, the program executed by the ECUs 102 and 103 in the processing monitoring unit 101 can be set as a program having higher priority than programs executed in the ECUs other than those in the processing monitoring unit 101.

Note that the example using the kernel space monitoring function is merely an example, and other configurations may be adopted.

It is only necessary to set the program executed by the ECUs 102 and 103 in the processing monitoring unit 101, i.e., the program for monitoring viruses and collecting logs so that the program is executed with higher priority than the programs (user programs) executed by the other ECUs.

3. Configuration in which Three or More Kinds of Processing are Switched in Accordance with Available Bandwidth of CAN Network Next, a configuration in which three or more kinds of processing are switched in accordance with the available bandwidth of the CAN network will be described.

In the processing sequence described above with reference to the flowchart shown in FIG. 4, in a case where a virus is detected from a CAN message transmitted and received via the CAN network 120, whether or not there is a margin in the available bandwidth of the CAN network, i.e., whether or not the available bandwidth is equal to or larger than the predetermined threshold is checked in step S103, and one of the following two kinds of processing is performed in accordance with the check result:

(the first processing (normal processing)) (step S105)=processing of collecting only a high-priority log and transmitting the log to the server; and (the second processing (emergency processing) (step S104))=processing of collecting all logs and transmitting the logs to the server.

As described above, the processing that is executed in accordance with the bandwidth usage status is not limited to the above two kinds, and three or more different kinds of processing can be performed.

A sequence of a case where three different kinds of processing are performed in accordance with the bandwidth usage status will be described with reference to a flowchart shown in FIG. 8.

Figure 8:
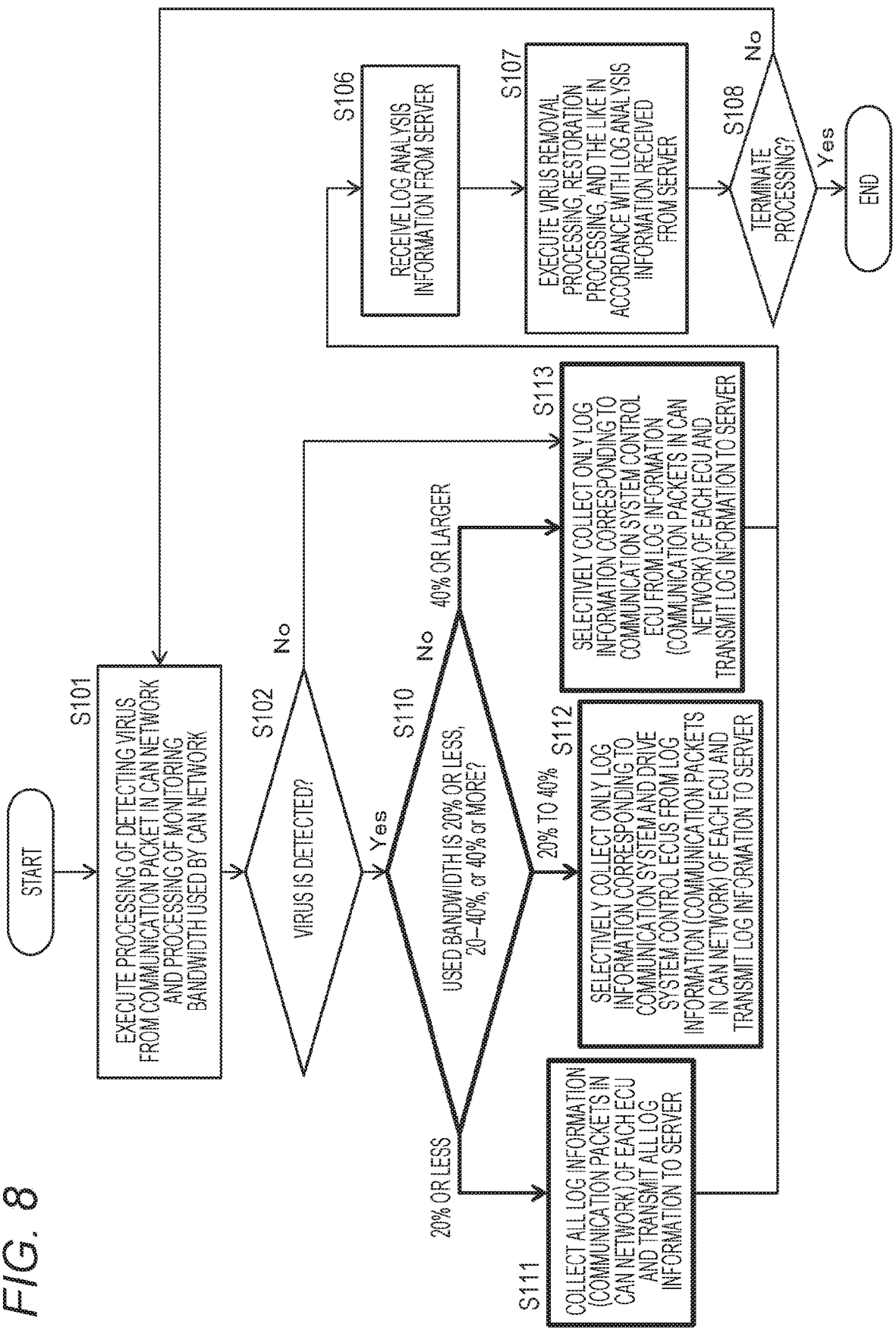
FIG. 8 is a flowchart showing a processing sequence executed by a processing monitoring unit.

The flowchart shown in FIG. 8, as well as the flowchart described above with reference to FIG. 4, is a flowchart for describing a sequence of processing executed by the processing monitoring unit 101 included in the moving apparatus 100 shown in FIG. 2.

The flow shown in FIG. 8 is executed by the ECUs in the processing monitoring unit 101.

Specifically, for example, the CPUs in the ECUs execute the flow in accordance with programs stored in the storage units.

In the flowchart shown in FIG. 8, the processing in steps S101, S102, and steps S106 to S108 are similar to the processing in steps S101, S102, and steps S106 to S108 shown in the flow of FIG. 4, respectively. Therefore, description thereof is omitted.

The flowchart shown in FIG. 8 is different from the flowchart shown in FIG. 4 in processing in steps S110 to S113 shown in FIG. 8.

The flow shown in FIG. 8 is different from the flow shown in FIG. 4 in that the processing in steps S103 to S105 in FIG. 4 are replaced with steps S110 to S113 in the flow shown in FIG. 8.

Details of steps S110 to S113 will be described.

(Step S110)

In a case where the ECU-1b (virus monitoring & log collection ECU) 103 detects a virus from a CAN message transmitted and received via the CAN network 120 in step S102, the processing proceeds to step S110.

In step S110, the processing monitoring unit checks the traffic of the CAN network.

That is, how much bandwidth the CAN network uses and how much bandwidth is available are checked.

In this embodiment, which of the following three kinds the bandwidth usage status corresponds to is determined:

(a) a large amount of available bandwidth: bandwidth load (used bandwidth)=20% or less;

(b) a medium amount of available bandwidth: bandwidth load (used bandwidth)=20% to 40%; and (c) a small amount of available bandwidth: bandwidth load (used bandwidth)=40% or more.

In this embodiment, which of the above three kinds the bandwidth usage status corresponds to is determined, and log information to be collected is changed in accordance with priority on the basis of the determination result.

In step S110, in a case where (a) a large amount of available bandwidth: bandwidth load (used bandwidth)=20% or less is determined, the processing proceeds to step S111.

Further, in step S110, in a case where (b) a medium amount of available bandwidth: bandwidth load (used bandwidth)=20% to 40% is determined, the processing proceeds to step S112.

Further, in step S110, in a case where (c) a small amount of available bandwidth: bandwidth load (used bandwidth)=40% or more is determined, the processing proceeds to step S113.

(Step S111)

In the determination processing in step S110, in a case where (a) a large amount of available bandwidth: bandwidth load (used bandwidth)=20% or less is determined, the processing proceeds to step S111.

In step S111, the processing monitoring unit collects all log information based on communication messages (communication packets in the CAN network) issued by each ECU in the moving apparatus, and transmits the all log information to the log analysis server 200.

Specifically, the ECU-1b (virus monitoring & log collection ECU) 103 of the processing monitoring unit 101 shown in FIG. 2 collects all logs corresponding to all communication messages in the CAN network 120, and transmits the collected logs corresponding to all the communication messages to the log analysis server 200.

(Step S112)

Further, in the determination processing of step S110, in a case where (b) a medium amount of available bandwidth: bandwidth load (used bandwidth)=20% to 40% is determined, the processing proceeds to step S112.

In step S112, the processing monitoring unit collects only log information corresponding to a part of communication messages (communication packets in the CAN network) issued by each ECU in the moving apparatus and transmits the log information to the log analysis server 200.

Specifically, the ECU-1b (virus monitoring & log collection ECU) 103 of the processing monitoring unit 101 shown in FIG. 2 sets logs to be collected from communication messages in the CAN network 120 only to logs corresponding to communication messages that are limited in accordance with predetermined priority, and transmits only the collected logs corresponding to the limited messages to the log analysis server 200.

The priority of collecting logs of communication messages is set as described above with reference to FIG. 5.

That is, the priority is set as follows in accordance with a system of the ECU that issues a communication message:

first priority=a communication message issued by the communication system control ECU;

second priority=a communication message issued by the drive system control ECU; and third priority=a communication message issued by the body system control ECU.

Step S112 is processing performed in a case where (b) a medium amount of available bandwidth: bandwidth load (used bandwidth)=20% to 40% is determined in the determination processing of step S110.

In this case, only logs corresponding to communication messages having the first and second priority are collected and transmitted to the log analysis server 200.

That is, only logs corresponding to the following communication messages are collected and transmitted to the log analysis server 200:

the first priority=a communication message issued by the communication system control ECU; and the second priority=a communication message issued by drive system control ECU.

(Step S113)

Meanwhile, in a case where no virus is detected in the determination processing in step S102, or in a case where a virus is detected in the determination processing in step S102 and (c) a small amount of available bandwidth: bandwidth load (used bandwidth)=40% or more is determined in the determination processing in step S110, the processing proceeds to step S113.

In step S113, the processing monitoring unit collects only a part of the log information (communication packets in the CAN network) of each ECU in the moving apparatus and transmits the part of the log information to the log analysis server 200.

In step S112, the processing monitoring unit collects only log information corresponding to a part of communication messages (communication packets in the CAN network) issued by each ECU in the moving apparatus and transmits the log information to the log analysis server 200.

Specifically, the ECU-1b (virus monitoring & log collection ECU) 103 of the processing monitoring unit 101 shown in FIG. 2 sets logs to be collected from communication messages in the CAN network 120 only to logs corresponding to communication messages that are limited in accordance with predetermined priority, and transmits only the collected logs corresponding to the limited messages to the log analysis server 200.

The priority of collecting logs of communication messages is set as described above with reference to FIG. 5.

That is, the priority is set as follows in accordance with a system of the ECU that issues a communication message:

first priority=a communication message issued by the communication system control ECU;

second priority=a communication message issued by the drive system control ECU; and third priority=a communication message issued by the body system control ECU.

Step S113 is processing performed in a case where (c) a small amount of available bandwidth: bandwidth load (used bandwidth)=40% or more is determined in the determination processing in step S110.

In this case, only a log corresponding to a communication message having the first priority is collected and transmitted to the log analysis server 200.

That is, only a log corresponding to a communication message having the following first priority is collected and transmitted to the log analysis server 200:

the first priority=a communication message issued by the communication system control ECU.

After any of the processing in steps S111 to S113, the processing in and after step S106 is executed.

The processing in and after step S106 is similar to the processing described above with reference to FIG. 4. Thus, description thereof is omitted.

As described above, in this embodiment, the processing to be executed is changed by classifying the bandwidth usage status of the CAN network 120 into the following three kinds: That is, which of the following three kinds the bandwidth usage status corresponds to is determined:

(a) a large amount of available bandwidth: bandwidth load (used bandwidth)=20% or less;

(b) a medium amount of available bandwidth: bandwidth load (used bandwidth)=20% to 40%; and (c) a small amount of available bandwidth: bandwidth load (used bandwidth)=40% or more.

Then, log information to be collected is changed in accordance with priority on the basis of the determination result.

With such a setting, it is possible to efficiently collect a log required for virus analysis, without delaying normal communication data in the CAN network 120.

4. Examples of Log Collection Processing in Probe Car

Next, examples of log collection processing in a probe car will be described.

The probe car is a vehicle equipped with a camera for acquiring map information, traffic information, environmental information such as weather, or the like, and various sensors.

Specifically, examples thereof encompass a vehicle equipped with an omnidirectional camera for map creation and the like.

A configuration example of the probe car will be described with reference to FIG. 9.

Figure 9:
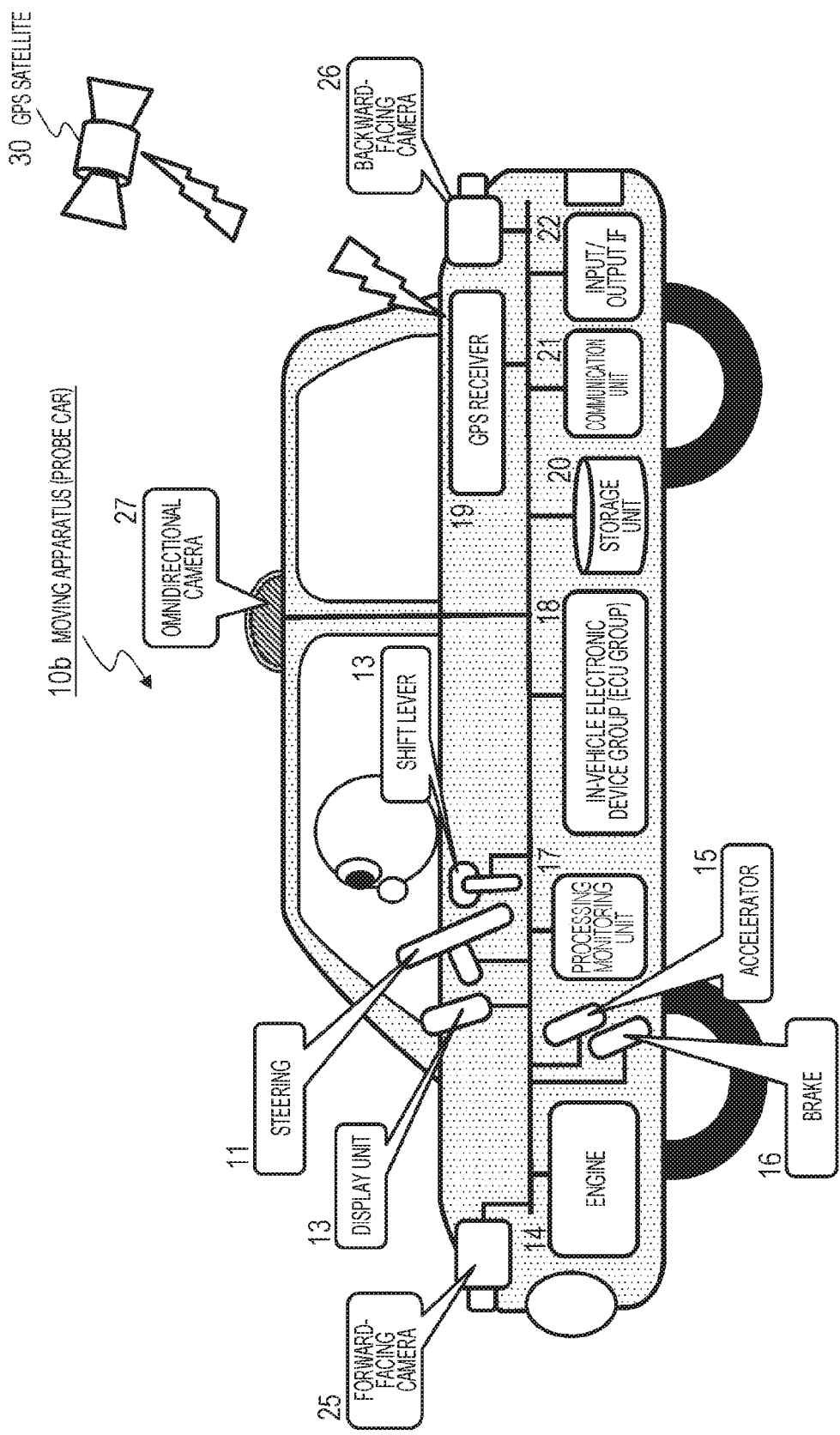
FIG. 9 shows a configuration example of a moving apparatus serving as a probe car.

FIG. 9 shows a configuration example of a moving apparatus (probe car) 10*b*.

As shown in FIG. 9, the moving apparatus (probe car) 10*b* includes not only the steering 11, the shift lever 12, the display unit 13, the engine 14, the accelerator 15, the brake 16, the processing monitoring unit 17, the in-vehicle electronic device group (ECU group) 18, the GPS receiver 19, the storage unit 20, the communication unit 21, and the input/output IF 22, but also a forward-facing camera 25, a backward-facing camera 26, and an omnidirectional camera 27.

Note that those components are merely some main components of the moving apparatus 10*b* (probe car), and the moving apparatus 10*b* (probe car) includes many other components in addition to those components.

Among the components of the moving apparatus (probe car) 10*b* shown in FIG. 9, the following components are the same as the components of the moving apparatus 10 described above with reference to FIG. 1: the steering 11, the shift lever 12, the display unit 13, the engine 14, the accelerator 15, the brake 16, the processing monitoring unit 17, the in-vehicle electronic device group (ECU group) 18, the GPS receiver 19, the storage unit 20, the communication unit 21, and the input/output IF 22.

The moving apparatus (probe car) 10*b* shown in FIG. 9 includes the forward-facing camera 25, the backward-facing camera 26, and the omnidirectional camera 27 in addition to the components of the moving apparatus 10 described above with reference to FIG. 1.

The forward-facing camera 25, the backward-facing camera 26, and the omnidirectional camera 27 are components of a probe car compatible sensor.

As described above, the probe car is a vehicle equipped with a camera for acquiring map information, traffic information, environmental information such as weather, or the like, and various sensors.

Herein, as an embodiment of the probe car, an exemplary probe car equipped with cameras to create map information and the like will be described as a representative example.

Not only the cameras but also various sensors can be used as the probe car compatible sensor. For example, in a case of a probe car that acquires traffic information, sensors such as a distance sensor and an acceleration sensor are mounted as the probe car compatible sensor. Further, in a case of a probe car that acquires weather information, various sensors such as a temperature sensor, a humidity sensor, and a barometric pressure sensor are mounted as the probe car compatible sensor.

In the following embodiment, a probe car equipped with cameras as the probe car compatible sensor to create map information and the like will be described as a representative example.

The in-vehicle electronic device group (ECU group) 18 shown in FIG. 9 includes a plurality of electronic control units (ECUs), and each ECU controls each configuration unit of the moving apparatus (probe car) 10*b*.

The ECU is connected to each component of the moving apparatus 10*b* (probe car) by the controller area network (CAN) standardized as the in-vehicle network, and performs control by transmitting and receiving a CAN message conforming to the CAN protocol.

The ECUs in the in-vehicle electronic device group (ECU group) 18 execute, for example, various kinds of control such as drive control regarding driving of the moving apparatus 10*b* (probe car) such as the engine 14, the steering 11, and the like, control of display information on the display unit 13, control of opening, closing, locking, and the like of doors, communication control in the communication unit 21, and imaging control of each camera.

The above control is performed by programs (software) executed by the ECUs.

The plurality of electronic control units (ECUs) included in the in-vehicle electronic device group (ECU group) 18 can be roughly classified into the following four groups:

(1) the drive system control ECU that performs drive control regarding driving of the moving apparatus (probe car) 10*b* such as the engine 14, the steering 11, the shift lever 12, the accelerator 15, and the brake 16;

(2) the body system control ECU that performs control of the body system other than the drive system of the moving apparatus, such as control of the display unit 13, air conditioning, and opening, closing, and locking of doors;

(3) the communication system control ECU that performs control regarding the communication unit 21, the input/output IF 22, the GPS receiver 19, and the like which perform communication and input and output of data with an external device or external storage device; and (4) a probe car compatible sensor (camera or the like) system control ECU that performs control regarding the forward-facing camera 25, the backward-facing camera 26, the omnidirectional camera 27, and the like.

Those electronic control units (ECUs) perform various kinds of processing in accordance with individual programs, respectively.

However, such ECUs controlled by programs (software) may be illegally controlled by a virus or malicious program intruding from the outside.

The virus may intrude at various timings from, for example, various wired or wireless illegal devices that illegally access the CAN from the outside.

The processing monitoring unit 17 shown in FIG. 9 is a monitoring apparatus for performing detection of such a virus and restoration processing.

The processing monitoring unit 17 acquires, for example, log information corresponding to various kinds of processing executed in the ECUs, and performs detection of fraud, restoration, and the like on the basis of the log information.

Further, the processing monitoring unit 17 transmits the acquired log information to an external server. The server executes analysis based on the log information, and transmits an analysis result to the processing monitoring unit 17. The processing monitoring unit 17 removes fraud (virus, program, or the like) and performs restoration processing by using the analysis result received from the server.

As described above, the plurality of electronic control units (ECUs) included in the in-vehicle electronic device group (ECU group) 18 controls each component of the moving apparatus (probe car) 10*b* shown in FIG. 9. Control data for this control is transferred via the controller area network (CAN) standardized as the in-vehicle network.

The ECUs and other components connected to the CAN transmit and receive CAN messages conforming to the CAN protocol.

Figure 10:
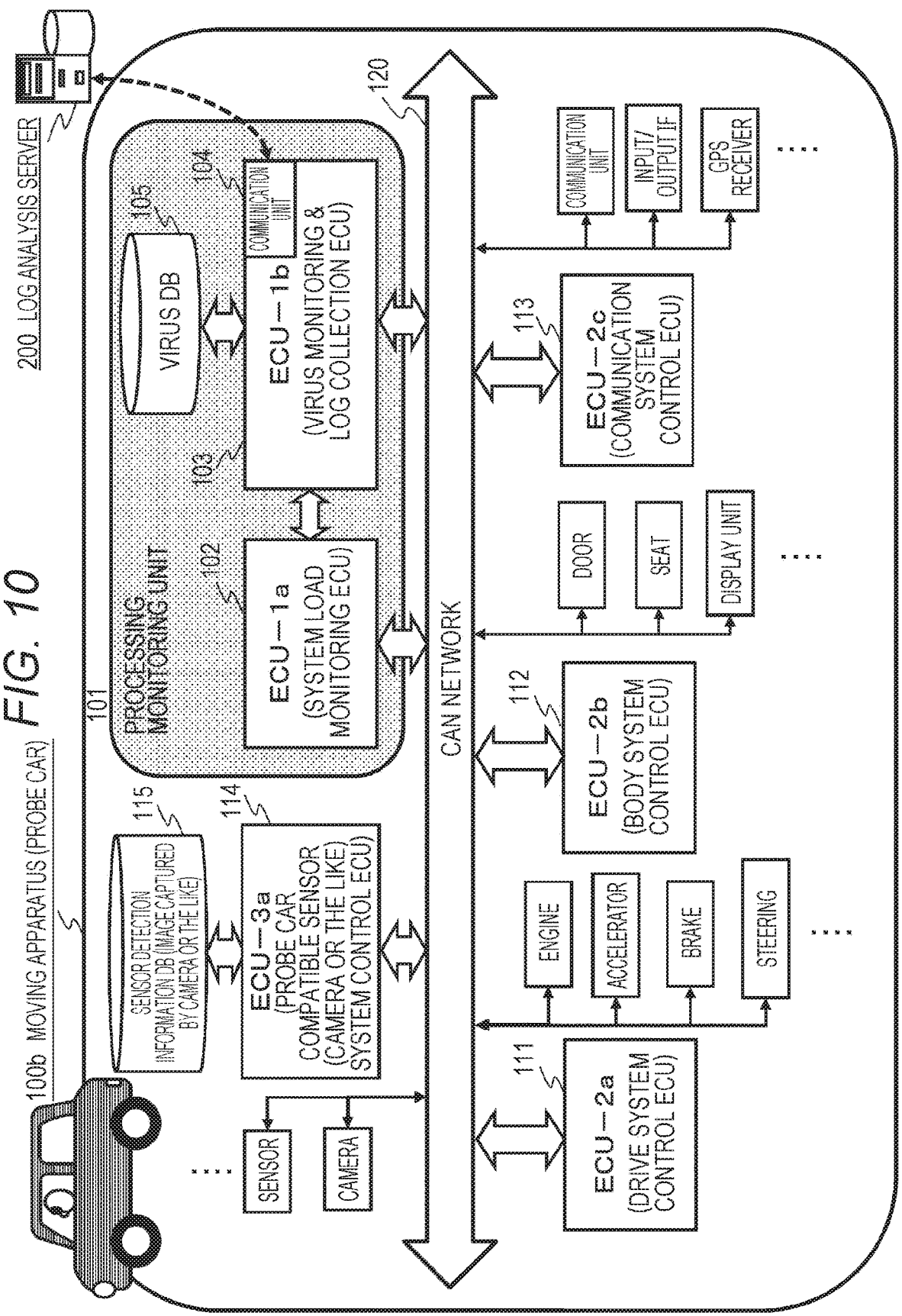
FIG. 10 shows a network configuration example of a moving apparatus that is a probe car.

FIG. 10 shows a network configuration example of the CAN.

A moving apparatus (probe car) 100b shown in FIG. 10 includes a plurality of ECUs 102, 103, and 111 to 114, and is configured so that the plurality of ECUs is connected to the CAN network 120 that is an in-vehicle network.

The ECUs 102 and 103 are ECUs included in a processing monitoring unit 101.

The ECUs 111 to 114 correspond to the four kinds of ECUs described above with reference to FIG. 1, i.e., the drive system control ECU, the body system control ECU, the communication system control ECU, and the probe car compatible sensor (camera or the like) system control ECU.

Various components to be controlled by the ECUs, i.e., the engine, the accelerator, the cameras, and the like are also connected to the CAN network. Those components are controlled in response to control messages generated by the ECUs in accordance with programs (software).

The ECUs perform control by generating a CAN message conforming to the CAN protocol and transmitting the message to various targets to be controlled.

The ECUs shown in FIG. 10 are the following six ECUs:

(1) the ECU-1a (system load monitoring ECU) 102;

(2) the ECU-1b (virus monitoring & log collection ECU) 103;

(3) the ECU-2a (drive system control ECU) 111;

(4) the ECU-2b (body system control ECU) 112;

(5) the ECU-2c (communication system control ECU) 113; and (6) an ECU-3a (probe car compatible sensor (camera or the like) control ECU) 114

Among the above ECUs, the ECUs (1) to (5) are similar to the ECUs described above with reference to FIG. 2.

The moving apparatus (probe car) 100b in this embodiment includes the (6) ECU-3a (probe car compatible sensor (camera or the like) control ECU) 114 in addition to the ECUs (1) to (5).

"(6) The ECU-3a (probe car compatible sensor (camera or the like) control ECU) 114" is a probe car compatible sensor (camera or the like) system control ECU that performs control regarding the probe car compatible sensor (camera or the like) such as the forward-facing camera 25, the backward-facing camera 26, and the omnidirectional camera 27 shown in FIG. 9.

The ECU-3a (probe car compatible sensor (camera or the like) control ECU) 114 executes imaging instruction control of the forward-facing camera 25, the backward-facing camera 26, and the omnidirectional camera 27 by using a CAN message transmitted via the CAN network 120. Further, the ECU-3a (probe car compatible sensor (camera or the like) control ECU) 114 executes processing of acquiring an image captured by each camera via the CAN network 120 and storing the image in a sensor detection information DB 115, and other processing.

The processing monitoring unit 101 performs processing by using the following two ECUs:

(1) ECU-1a (system load monitoring ECU) 102; and (2) ECU-1b (virus monitoring & log collection ECU) 103.

Herein, the processing monitoring unit 101 changes log information to be collected from the CAN network 120 in accordance with an increase or decrease of the traffic of the CAN network 120.

Specifically, the ECU-1a (system load monitoring ECU) 102 monitors the communication status of the CAN network 120, and, in a case where the traffic (communication usage bandwidth) of the CAN network 120 is equal to or less than the predetermined threshold, the ECU-1b (virus monitoring & log collection ECU) 103 collects log information corresponding to all communication messages from the CAN network 120 and transmits the log information to the log analysis server 200.

Note that the log information includes, for example, contents of a communication message, a message length, a communication period, communication sequence information, and the like included in the communication message in the CAN network 120.

The ECU-1b (virus monitoring & log collection ECU) 103 of the processing monitoring unit 101 acquires a communication message in the CAN network 120, and analyzes the contents of the communication message, the message length, the communication period, the communication sequence, and the like, and then transmits each piece of the above information to the log analysis server 200 as log information.

Meanwhile, in a case where the traffic (communication usage bandwidth) of the CAN network 120 is larger than the predetermined threshold, the ECU-1b (virus monitoring & log collection ECU) 103 sets log information to be acquired on the basis of communication messages in the CAN network 120 only to logs corresponding to communication messages that are limited in accordance with the predetermined priority, and transmits only the collected limited logs to the log analysis server 200.

A sequence of the processing executed by the processing monitoring unit 101 included in the moving apparatus (probe car) 100b shown in FIG. 10 will be described with reference to flowcharts shown in FIGS. 11 and 12.

Figure 11:
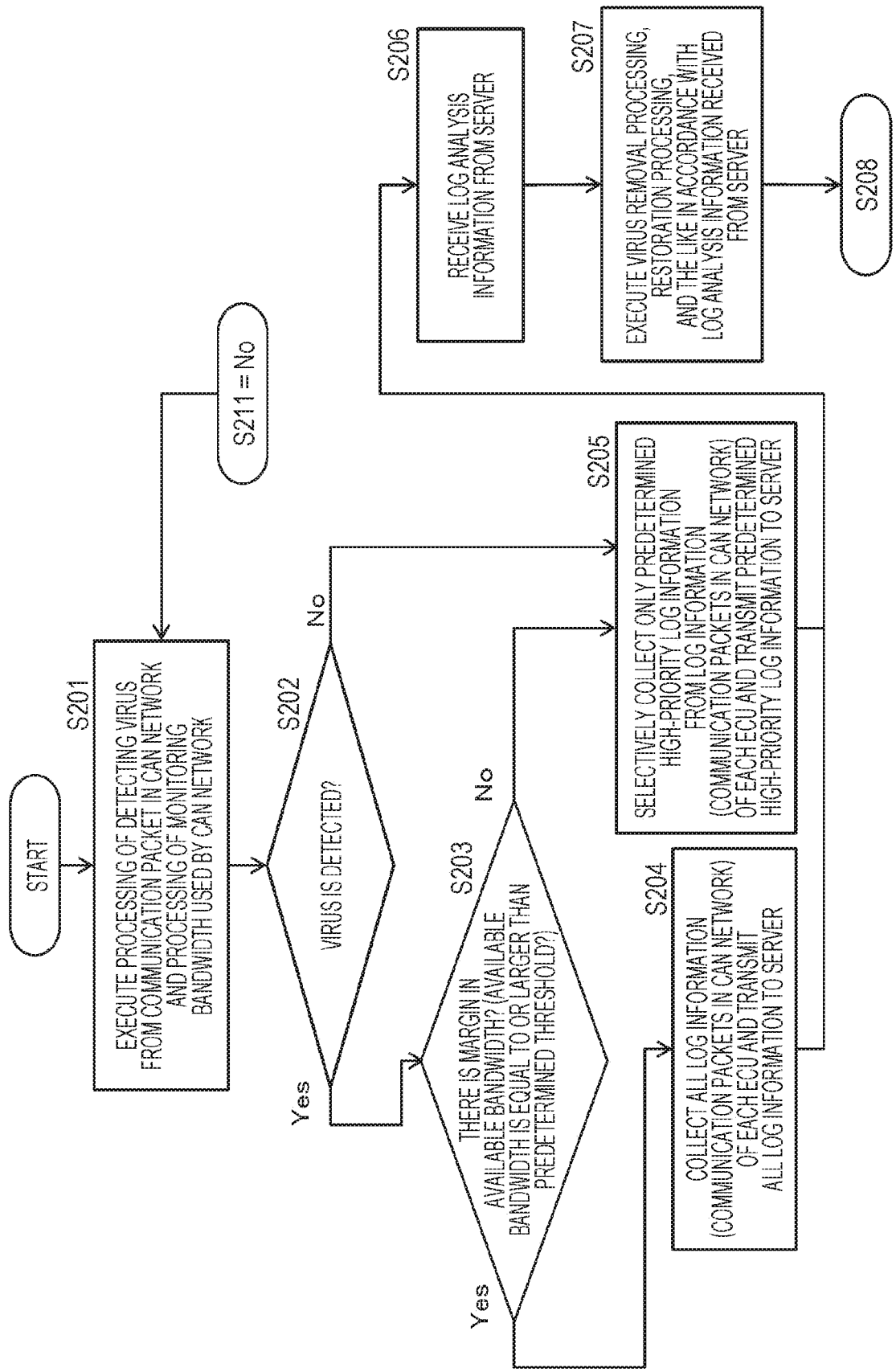
FIG. 11 is a flowchart showing a processing sequence executed by a processing monitoring unit of a moving apparatus that is a probe car.
Figure 12:
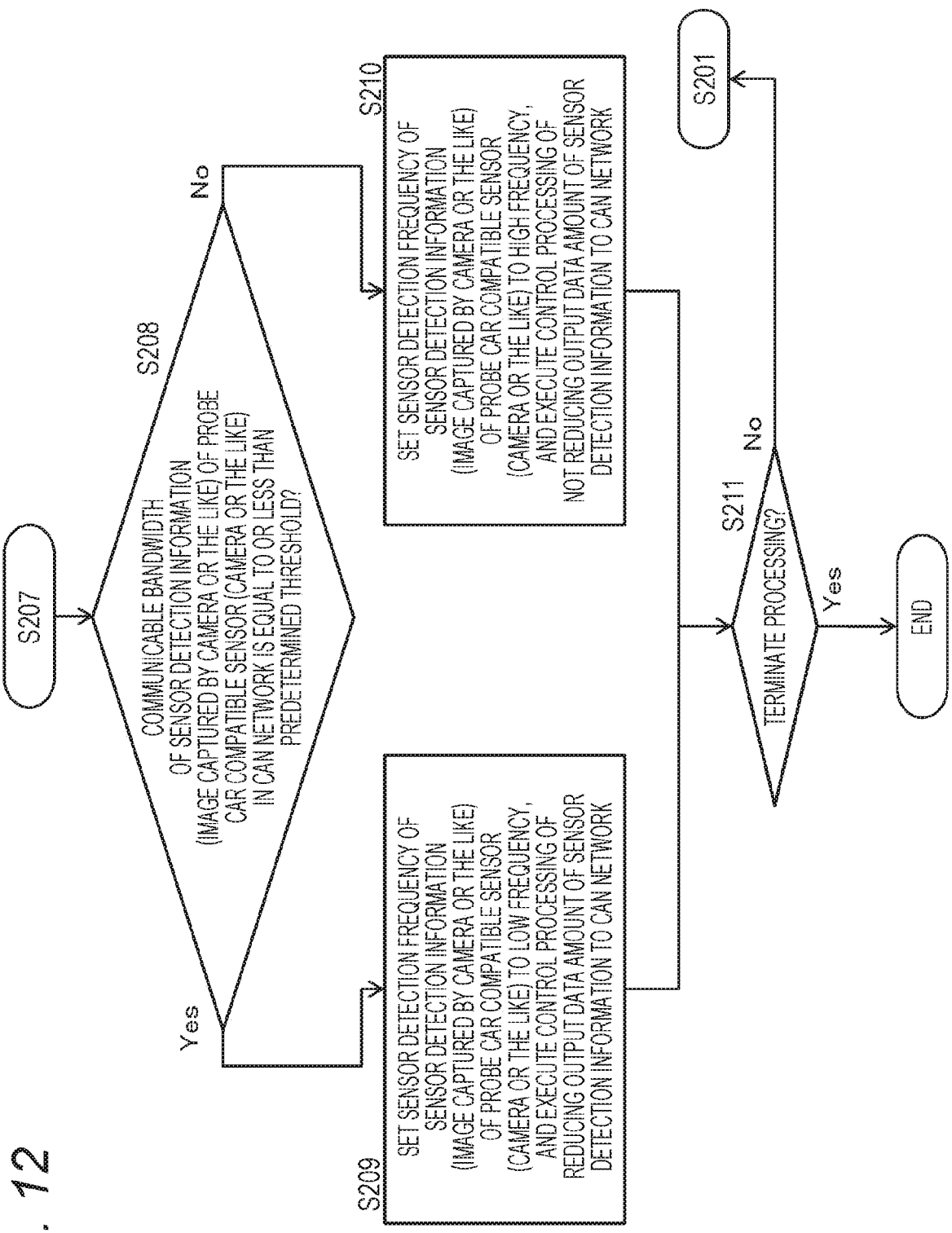
FIG. 12 is a flowchart showing a processing sequence executed by a processing monitoring unit of a moving apparatus that is a probe car.

FIGS. 11 and 12 are flowcharts showing a processing sequence executed by the processing monitoring unit 101 of the moving apparatus (probe car) 100b.

The flows shown in FIGS. 11 and 12 are executed by the ECUs in the processing monitoring unit 101.

Specifically, for example, the CPUs in the ECUs execute the flow in accordance with programs stored in the storage units.

Hereinafter, processing in each step of the flowcharts shown in FIGS. 11 and 12 will be sequentially described.

The flow shown in FIG. 11 is the first half of the processing sequence executed by the processing monitoring unit 101 of the moving apparatus (probe car) 100b, and the flow shown in FIG. 12 is the second half of the processing sequence.

Processing in steps S201 to S208 shown in the first half of the processing flow shown in FIG. 11 is substantially similar to the processing in steps S101 to S108 shown in the normal processing sequence executed by the processing monitoring unit 101 of the moving apparatus 10 described above with reference to FIG. 4.

However, a processing mode of processing of selectively collecting a high-priority log in step S205 is different from the normal processing in processing step S105 executed by the processing monitoring unit 101 of the moving apparatus 10 described with reference to FIG. 4.

This processing will be described.

(Step S205)

In any of the following cases, the processing in step S205 is executed:

in a case where no virus is detected in the determination processing in step S202; and in a case where a virus is detected in the determination processing in step S202 and it is determined in the determination processing in step S203 that the available bandwidth is less than the predetermined threshold (less than 50%) and there is no margin in the available bandwidth of the network.

In step S205, the processing monitoring unit collects only log information corresponding to a part of communication messages (communication packets in the CAN network) issued by each ECU in the moving apparatus and transmits the log information to the log analysis server 200.

Specifically, the ECU-1b (virus monitoring & log collection ECU) 103 of the processing monitoring unit 101 shown in FIG. 10 sets logs to be collected from communication messages in the CAN network 120 only to logs corresponding to communication messages that are limited in accordance with the predetermined priority, and transmits only the collected logs corresponding to the limited messages to the log analysis server 200.

In a case where the processing in step S205 is executed, the processing monitoring unit 101 limits logs to be collected in accordance with the predetermined priority.

FIG. 13 shows examples of the predetermined priority.

An example of setting log information priority shown in FIG. 13 is an example of setting priority according to a system of the ECU that issues a communication message as described below:

first priority=a communication message issued by the communication system control ECU;

second priority=a communication message issued by the drive system control ECU; and the third priority=communication messages issued by the body system control ECU and the probe car compatible sensor (camera) system control ECU.

The example of setting log information priority for the normal moving apparatus 100 has been described above with reference to FIG. 5. However, the example of setting log information priority for the moving apparatus (probe car) 100*b* shown in FIG. 13 is different from the above example in that a communication message issued by the probe car compatible sensor (camera) system control ECU is added as the third priority.

The first priority and the second priority are similar to as the settings described above with reference to FIG. 5.

That is, the communication system control ECU to which the first priority is set corresponds to the ECU-2c (communication system control ECU) 113 shown in FIG. 10. The ECU-2c (communication system control ECU) 113 is a communication system control ECU that performs control regarding a communication unit, an input/output IF, a GPS receiver, and the like which perform communication or input and output of data with an external device or external storage device.

The external device, the external storage device, and the like serving as targets to be controlled by the communication system control ECU are likely to be a path through which a virus or malicious program intrudes.

Further, the drive system control ECU to which the second priority is set corresponds to the ECU-2a (drive system control ECU) 111 shown in FIG. 2. The ECU-2a (drive system control ECU) 111 is a drive system control ECU that performs drive control regarding driving of the moving apparatus (probe car) 100*b* such as the engine, the steering, the shift lever, the accelerator, and the brake.

The drive system control ECU is an ECU that performs control regarding driving of the moving apparatus (probe car) 100*b*, and causes a serious problem if erroneous processing is performed due to a virus or the like.

For this reason, a log corresponding to a communication message issued by the drive system control ECU is set to be a target to be collected and analyzed with the second priority.

Logs corresponding to messages set to have the third priority in this embodiment are logs corresponding to communication messages issued by the body system control ECU described above with reference to FIG. 5 and the probe car compatible sensor (camera) system control ECU.

The body system control ECU corresponds to the ECU-2b (body system control ECU) 112 shown in FIG. 10. The ECU-2b (body system control ECU) 112 is a body system control ECU that performs control of a body system other than the drive system of the moving apparatus, such as control of a display unit, air conditioning, and opening, closing, and locking of doors.

Further, the probe car compatible sensor (camera) system control ECU corresponds to the ECU-3a (probe car compatible sensor (camera) system control ECU) 114 shown in FIG. 10. The ECU-3a (probe car compatible sensor (camera) system control ECU) 114 is an ECU that controls cameras mounted on the moving apparatus (probe car).

The body system control ECU and the probe car compatible sensor (camera) system control ECU are ECUs that performs control regarding parts other than the parts regarding driving of the moving apparatus (probe car) 100*b*, and is unlikely to affect driving of the moving apparatus (probe car) 100*b* even if erroneous processing is performed due to a virus or the like.

For this reason, logs corresponding to communication messages issued by the body system control ECU and the probe car compatible sensor (camera) system control ECU are collected and analyzed with the third priority.

Note that the log information collected by the ECU-1b (virus monitoring & log collection ECU) 103 of the processing monitoring unit 101 shown in FIG. 10 and transmitted to the log analysis server 200 may be a communication message in the CAN network 120, and the log information corresponding to the body system control ECU and the probe car compatible sensor (camera) system control ECU having the third priority preferably includes information that can be used for analyzing a control sequence of a target to be controlled, such as, for example, the contents of the communication message, the communication sequence information (time information), and the like.

When the above information is included therein, virus analysis in a drive system control message can be efficiently executed.

The ECU-1b (virus monitoring & log collection ECU) 103 of the processing monitoring unit 101 acquires a communication message in the CAN network 120, and also acquires information that can be used for analyzing a control sequence of a target to be controlled, and then transmits information including the communication message and the sequence information to the log analysis server 200 as log information.

Note that the example of setting log information priority shown in FIG. 13 is merely an example, and other various priority settings can be performed.

The ECU-1b (virus monitoring & log collection ECU) 103 of the processing monitoring unit 101 shown in FIG. 10 stores, for example, a priority list corresponding to log information priority setting information shown in FIG. 13 in the storage unit in the ECU.

The ECU-1b (virus monitoring & log collection ECU) 103 acquires bandwidth information of the CAN network 120 acquired by the ECU-1a (system load monitoring ECU) 102 in the processing in step S203, and determines whether or not a log to be acquired is limited to a high-priority log on the basis of the acquired bandwidth information.

Step S205 is processing performed in a case where it is determined in the band determination processing in step S203 that the available bandwidth is less than the predetermined threshold and there is a small margin in the remaining available communication bandwidth. In the processing, only a log corresponding to a message having high priority is selectively collected and is transmitted to the log analysis server 200.

Specifically, for example, only logs corresponding to communication messages generated by the communication system control ECU having the first priority and the drive system control ECU having the second priority shown in FIG. 13 are selectively collected, and only the selectively collected logs are transmitted to the log analysis server 200.

Note that setting of a high-priority log to be selected can be variously performed.

For example, only a log of the communication system control ECU having the first priority shown in FIG. 13 can also be set to a target to be selected.

Further, in the example of setting priority shown in FIG. 13, targets to be controlled by the ECUs are set as priority classification information as follows:

the first priority=a communication message issued by the communication system control ECU;

the second priority=a communication message issued by the drive system control ECU; and the third priority=communication messages issued by the body system control ECU and the probe car compatible sensor (camera) system control ECU.

Further, the communication message generated by each ECU may be classified for each target to be controlled (engine, accelerator, camera, or the like), and priority of the individual target to be controlled may be set.

Furthermore, as described above with reference to the flowchart shown in FIG. 8, the bandwidth usage status is further subdivided as follows, for example:

(a) a large amount of available bandwidth: bandwidth load (used bandwidth)=20% or less;

(b) a medium amount of available bandwidth: bandwidth load (used bandwidth)=20% to 40%; and (c) a small amount of available bandwidth: bandwidth load (used bandwidth)=40% or more.

As described above, which of the above three kinds the bandwidth usage status corresponds to may be determined, and log information to be collected may be changed in accordance with priority on the basis of the determination result.

The processing in steps S206 and S207 is similar to the processing in steps S106 and S107 described above with reference to the flow in FIG. 5.

In this embodiment, i.e., in a case where the probe car is used, the processing in and after step S208 shown in FIG. 12 is further performed after step S207.

The processing in and after step S208 will be described.

(Step S208)

In step S208, the processing monitoring unit 101 determines whether or not a communicable bandwidth of the sensor detection information (image captured by the camera or the like) of the probe car compatible sensor (camera or the like) in the CAN network 120 is equal to or less than a predetermined threshold.

The predetermined threshold is a threshold corresponding to a predetermined probe car compatible sensor (camera or the like), and is, for example, 30% of the entire communication bandwidth in the CAN network 120 as an example.

In step S208, in a case where the communicable bandwidth of the sensor detection information (image captured by the camera or the like) of the probe car compatible sensor (camera or the like) in the CAN network 120 is equal to or less than the threshold (30% of the previous communication bandwidth), the processing proceeds to step S209.

Meanwhile, in a case where the communicable bandwidth thereof is neither equal to nor less than the threshold (30% of the entire communication bandwidth), the processing proceeds to step S210.

(Step S209)

In step S208, in a case where it is determined that the communicable bandwidth of the sensor detection information (image captured by the camera or the like) of the probe car compatible sensor (camera or the like) in the CAN network 120 is equal to or less than the threshold (30% of the previous communication bandwidth), the processing proceeds to step S209.

In step S209, sensor detection frequency of the sensor detection information (image captured by the camera or the like) of the probe car compatible sensor (camera or the like) (frequency of outputting the detection information to the CAN network) is set to low frequency, and control processing of reducing an output data amount of the sensor detection information to the CAN network is executed.

Specifically, the ECU-1a (system load monitoring ECU) 102 of the processing monitoring unit 101 in the moving apparatus (probe car) 100b shown in FIG. 10 transmits a message (command) to the ECU-3a (probe car compatible sensor (camera or the like) control ECU) 114 so as to reduce frequency of acquiring images captured by the cameras.

In response to the message (command) received from the ECU-1a (system load monitoring ECU) 102, the ECU-3a (probe car compatible sensor (camera or the like) control ECU) 114 performs control so as to reduce the frequency of outputting images captured by each camera which is a target to be controlled to the CAN network 120.

With this processing, it is possible to reduce congestion of the CAN network 120, and prevent a delay and the like of communication of other important communication messages.

(Step S210)

Meanwhile, in step S208, in a case where it is determined that the communicable bandwidth of the sensor detection information (image captured by the camera or the like) of the probe car compatible sensor (camera or the like) in the CAN network 120 is neither equal to nor less than the predetermined threshold (30% of the previous communication bandwidth), the processing proceeds to step S210.

In step S210, the sensor detection frequency of the sensor detection information (image captured by the camera or the like) of the probe car compatible sensor (camera or the like) (frequency of outputting the detection information to the CAN network) is set to high frequency, and control processing of not reducing an output data amount of the sensor detection information to the CAN network is executed.

Specifically, the ECU-1a (system load monitoring ECU) 102 of the processing monitoring unit 101 in the moving apparatus (probe car) 100b shown in FIG. 10 transmits a message (command) to the ECU-3a (probe car compatible sensor (camera or the like) control ECU) 114 so as not to reduce the frequency of acquiring images captured by the cameras.

In response to the message (command) received from the ECU-1a (system load monitoring ECU) 102, the ECU-3a (probe car compatible sensor (camera or the like) control ECU) 114 performs control so as not to reduce the frequency of outputting images captured by each camera which is a target to be controlled to the CAN network 120.

With this processing, it is possible to maintain the sensor detection information of the cameras or the like with high density.

Also in this state, the congestion of the CAN network 120 does not become extremely high, and thus control can be performed without causing a delay and the like of communication of other important communication messages.

(Step S211)

When either step S209 or step S210 is completed, the processing proceeds to step S211.

Next, in step S211, whether to terminate the processing is determined. In a case where the processing is not terminated, the processing returns to step S201, and the processing of detecting a virus from a communication packet in the CAN network and the processing of monitoring the bandwidth used by the CAN network are continuously executed.

Meanwhile, for example, in a case where movement of the moving apparatus (probe car) 100b is stopped and a power supply is turned off, it is determined in step S211 that the processing is terminated, and the processing is terminated.

5. Other Embodiments

Next, other embodiments will be described.

The following two embodiments will be described:

(a) an embodiment in which the number of ECUs included in the processing monitoring unit 101 is one; and (b) an embodiment in which the processing monitoring unit 101 is provided as an information processing apparatus detachable from the moving apparatus 100.

First, (a) the embodiment in which the number of ECUs included in the processing monitoring unit 101 is one will be described with reference to FIG. 14.

Figure 14:
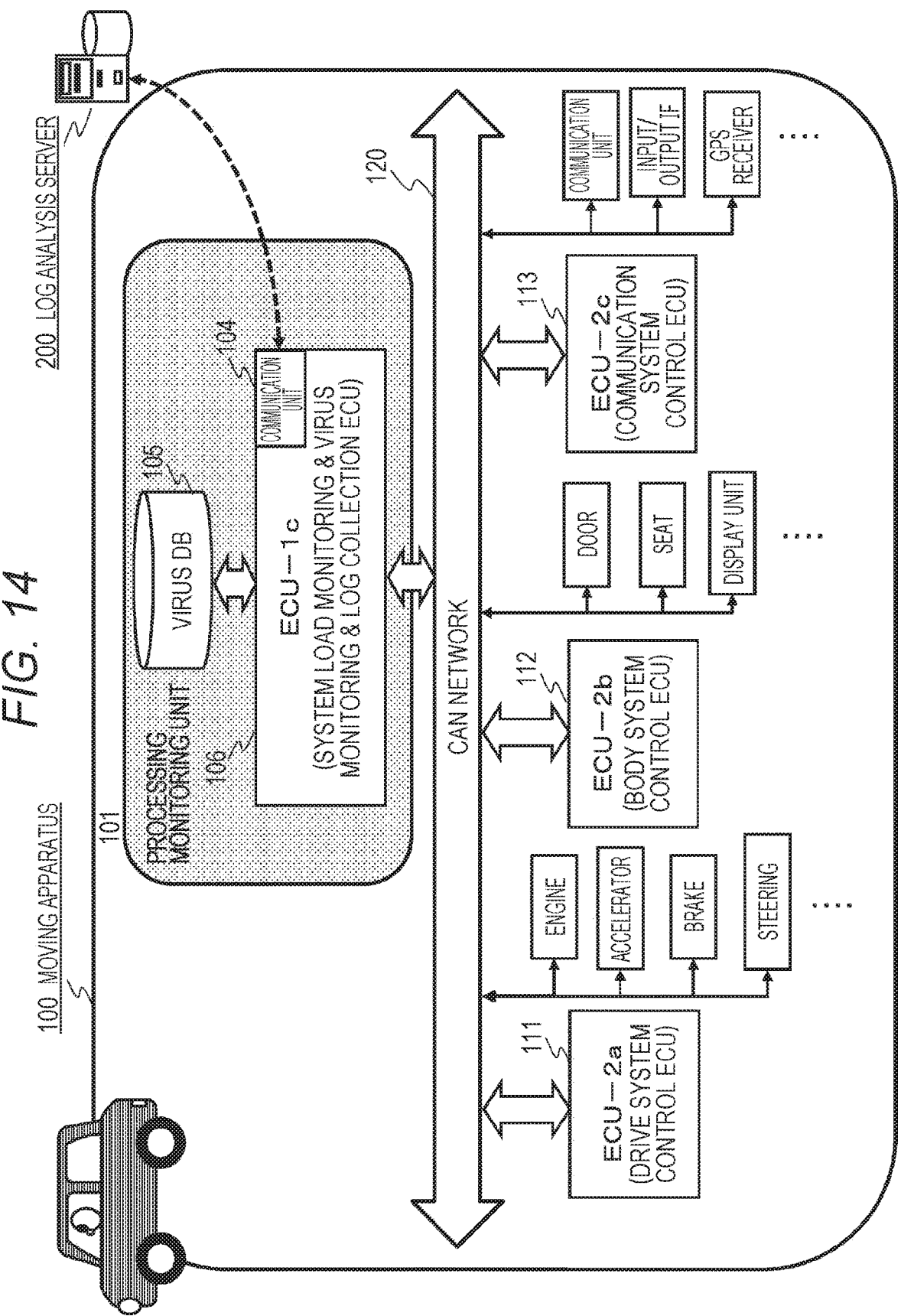
FIG. 14 shows a configuration example in which a single ECU is provided in a processing monitoring unit of a moving apparatus.

The moving apparatus 100 shown in FIG. 14 is a modification example of the moving apparatus 100 described above with reference to FIG. 2.

In the moving apparatus 100 described above with reference to FIG. 2, the processing monitoring unit 101 includes the following two ECUs:

(1) the ECU-1a (system load monitoring ECU) 102"; and (2) the ECU-1b (virus monitoring & log collection ECU) 103".

Meanwhile, in the moving apparatus 100 shown in FIG. 14, the processing monitoring unit 101 includes the following only one ECU:

(1) an ECU-1c (system load monitoring & virus monitoring & log collection ECU) 106.

The ECU-1c (system load monitoring & virus monitoring & log collection ECU) 106 executes all the processing executed by the ECU-1a (system load monitoring ECU) 102 and the ECU-1b (virus monitoring & log collection ECU) 103 described above with reference to FIG. 2.

That is, the ECU-1c (system load monitoring & virus monitoring & log collection ECU) 106 monitors the bandwidth usage status of the CAN network 120, acquires log information based on a CAN message transmitted and received via the CAN network 120, and executes virus detection processing and the like based on the acquired log information.

Further, the ECU-1c (system load monitoring & virus monitoring & log collection ECU) 106 executes transmission and reception processing with the log analysis server 200 via the communication unit 104, and also executes processing of transmitting the acquired log information to the log analysis server 200, processing of receiving analysis information from the log analysis server 200, and antivirus processing such as elimination of viruses based on received information.

As described above, the processing monitoring unit 101 can include a single ECU, and can also include individual ECUs for respective processing units.

Next, (b) the embodiment in which the processing monitoring unit 101 is provided as an information processing apparatus attachable to and detachable from the moving apparatus 100 will be described with reference to FIG. 15.

In the moving apparatus 100 shown in FIG. 15, as well as in the configuration described with reference to FIG. 14, the processing monitoring unit 101 includes the following only one ECU:

(1) the ECU-1c (system load monitoring & virus monitoring & log collection ECU) 106.

Figure 15:
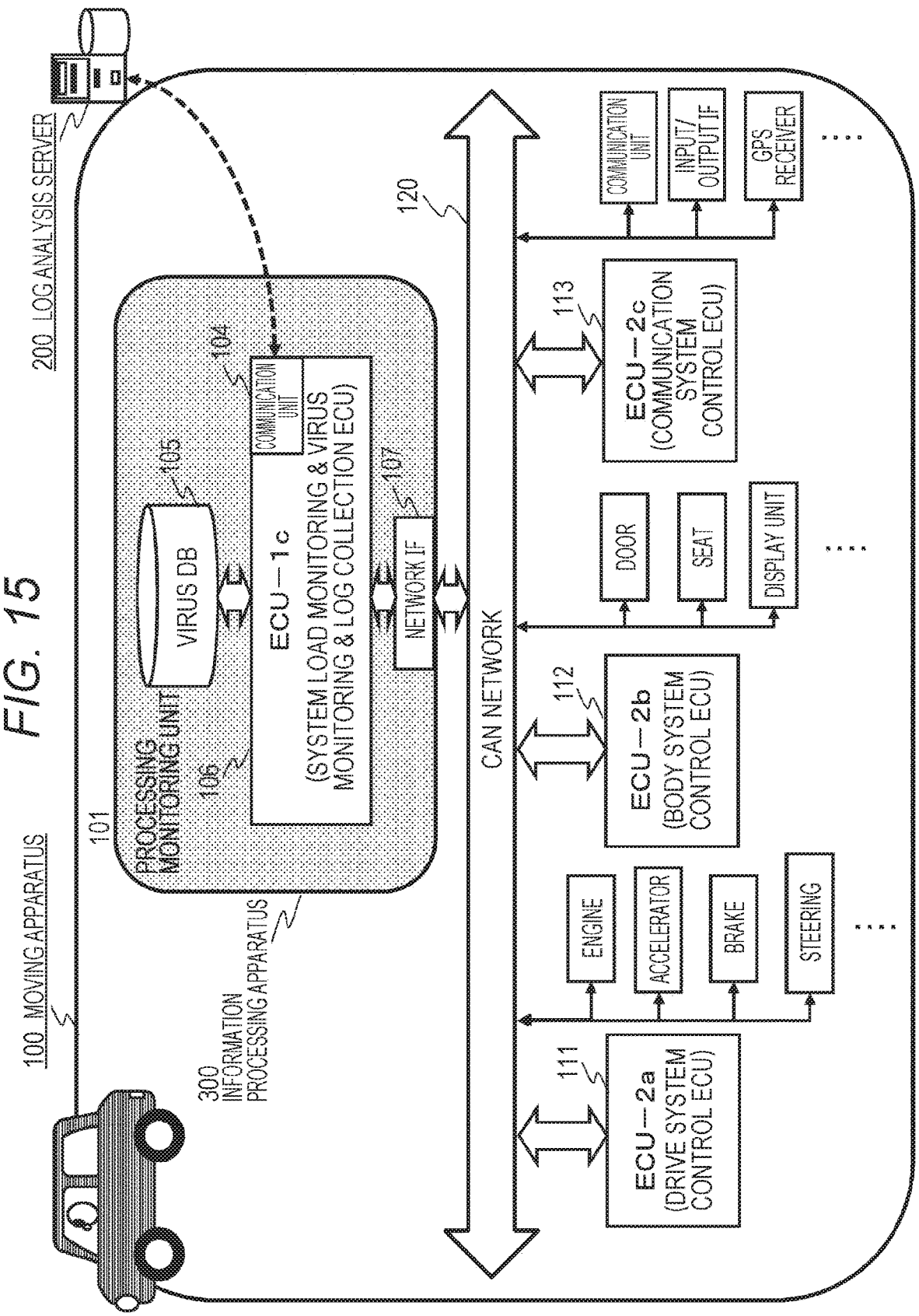
FIG. 15 shows a configuration example in which a processing monitoring unit of a moving apparatus is provided as an information processing apparatus attachable to and detachable from the moving apparatus.

The embodiment shown in FIG. 15 is an example in which the processing monitoring unit 101 is provided as an independent information processing apparatus 300 attachable to and detachable from the moving apparatus 100.

The information processing apparatus 300 is connected to the CAN network 120 of the moving apparatus 100 via a network interface (IF), and can output a message to the CAN network 120 and can acquire a message from the CAN network 120.

The information processing apparatus 300 can be attached to the moving apparatus 100 as necessary and be detached from the moving apparatus 100 when not used.

Figure 16:
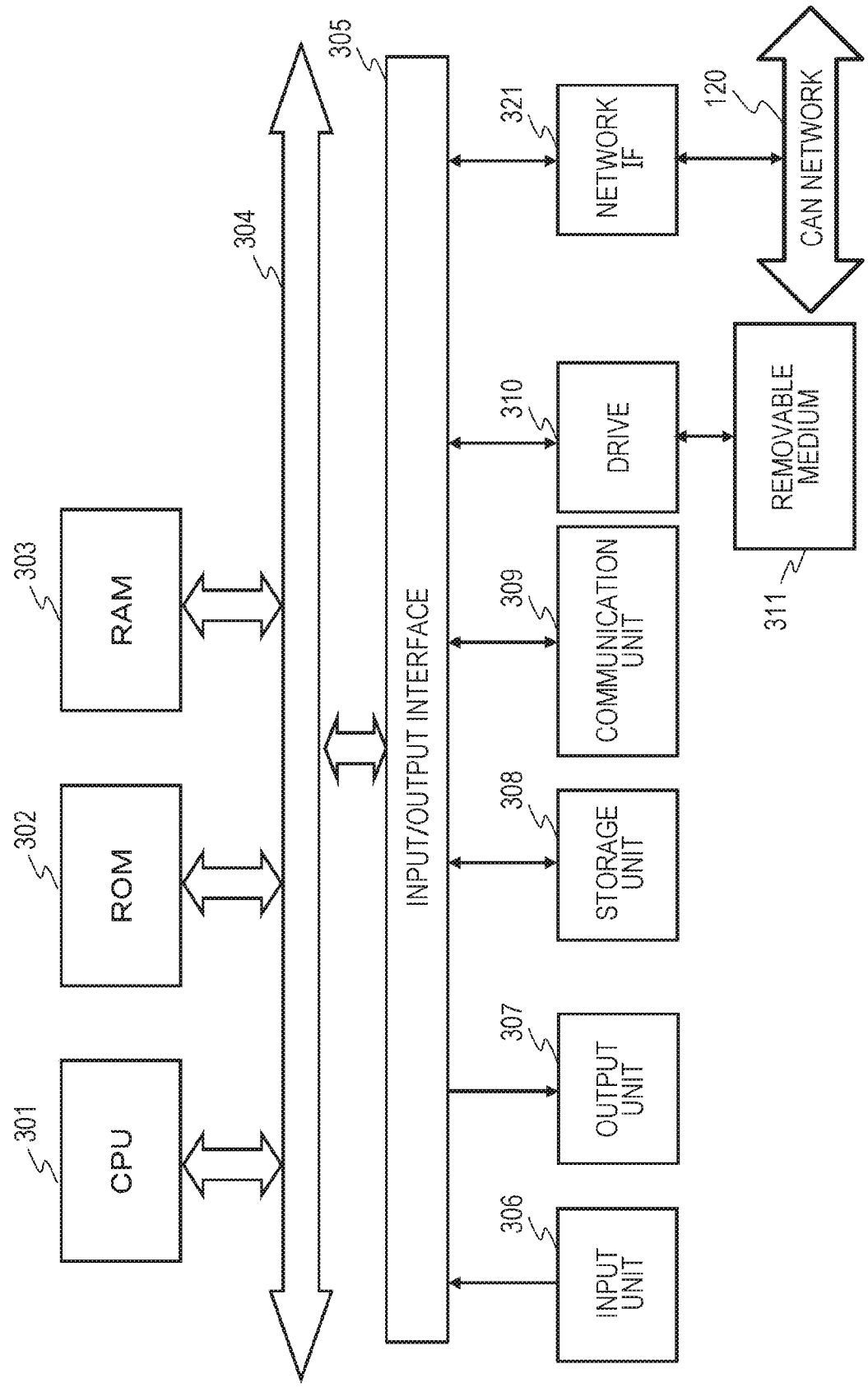
FIG. 16 shows a hardware configuration example of an information processing apparatus.

FIG. 16 shows a hardware configuration example of the information processing apparatus 300.

The hardware configuration example of the information processing apparatus 300 will be described with reference to FIG. 16.

A central processing unit (CPU) 301 functions as a data processing unit that executes various kinds of processing in accordance with programs stored in a read only memory (ROM) 302 or storage unit 308. For example, the processing according to the sequences described in the above embodiment is executed. A random access memory (RAM) 303 stores programs executed by the CPU 301, parameters, and various kinds of data, and is also used as a work area for executing the programs. The CPU 301, the ROM 302, and the RAM 303 are connected to each other by a bus 304.

The CPU 301 is connected to an input/output interface 305 via the bus 304. The input/output interface 305 is connected to an input unit 306 including a data acquisition unit and the like, such as various switches, a keyboard, a touchscreen, a mouse, and a microphone and is also connected to an output unit 307 including a display, a speaker, and the like.

Further, the information processing apparatus 300 is connected to the CAN network 120 via a network IF 321 and outputs a message to the CAN network 120 and receives a message from the CAN network 120.

The CPU 301 executes processing such as generation of log information and virus analysis based on a message input from the CAN network 120. Further, the CPU 301 executes processing based on a command or the like input from the input unit 306, and outputs a processing result to, for example, the output unit 307.

The storage unit 308 connected to the input/output interface 305 includes, for example, a hard disk and the like, and stores the programs executed by the CPU 301 and various kinds of data. A communication unit 309 functions as a transmission/reception unit for data communication via a network such as the Internet or a local area network, and communicates with an external device.

A drive 130 connected to the input/output interface 305 drives a removable medium 311, such as a magnetic disk, an optical disk, a magneto-optical disk, or a semiconductor memory such as a memory card, to record or read data.

Because the information processing apparatus 300 having the configuration shown in FIG. 16 is attached to the moving apparatus 100 shown in FIG. 15, it is possible to perform monitoring of communication messages transmitted and received via the CAN network 120 in the moving apparatus 100, acquisition of logs, and virus elimination processing.

6. Summary of Configurations of Present Disclosure

Hereinabove, the embodiments of the present disclosure have been described in detail by referring to specific embodiments. However, it is obvious that those skilled in the art can make modifications and substitutions of the embodiments, without departing from the scope of the present disclosure. That is, the present invention has been described in the form of illustration, and should not be interpreted in a limited manner. The claims should be taken into consideration in order to determine the gist of the present disclosure.

Note that the technology disclosed in this specification can be configured as follows.

(1) An information processing apparatus including
a processing monitoring unit configured to execute processing of monitoring a data communication network, in which:
the processing monitoring unit includes
a system load monitoring unit configured to monitor an available bandwidth of the data communication network, and
a virus monitoring unit configured to collect log information corresponding to a communication message in the data communication network and perform virus detection based on the log information; and
the virus monitoring unit
is configured to change a mode of collecting the log information in accordance with information regarding the available bandwidth of the data communication network acquired by the system load monitoring unit, and
in a case where the available bandwidth of the data communication network is neither equal to nor larger than a predetermined threshold, collects only limited log information corresponding to a high-priority communication message in accordance with predetermined priority information.

(2) The information processing apparatus according to (1), in which
in a case where the available bandwidth of the data communication network is equal to or larger than the predetermined threshold,
the virus monitoring unit collects not only the log information corresponding to the high-priority communication message but also log information corresponding to a low-priority communication message.

(3) The information processing apparatus according to (1) or (2), in which
in a case where a virus is detected from the data communication network and the available bandwidth of the data communication network is equal to or larger than the predetermined threshold,
the virus monitoring unit collects not only the limited log information corresponding to the high-priority communication message but also log information corresponding to a low-priority communication message.

(4) The information processing apparatus according to any one of (1) to (3), in which
the virus monitoring unit
transmits the collected log information to a log analysis server.

(5) The information processing apparatus according to any one of (1) to (4), in which
in a case where a virus is detected from the data communication network and the available bandwidth of the data communication network is neither equal to nor larger than the predetermined threshold,
the virus monitoring unit collects at least log information corresponding to a communication message issued by a communication system control electronic control unit (ECU).

(6) The information processing apparatus according to any one of (1) to (5), in which
the virus monitoring unit
is configured to store priority information regarding log collection in a storage unit, and
in a case where a virus is detected from the data communication network and the available bandwidth of the data communication network is neither equal to nor larger than the predetermined threshold, determines log information to be collected in accordance with order of priority obtained from the information stored in the storage unit.

(7) The information processing apparatus according to any one of (1) to (6), in which the data communication network is a controller area network (CAN) configured to transmit and receive a communication message for controlling a component of the moving apparatus.

(8) The information processing apparatus according to any one of (1) to (7), in which the priority information applied by the virus monitoring unit to determine log information to be collected is priority information set for each electronic control unit (ECU) connected to the data communication network.

(9) The information processing apparatus according to any one of (1) to (8), in which
the priority information is priority information set as follows:
log information corresponding to a communication message issued by the communication system control electronic control unit (ECU) having first priority;
log information corresponding to a communication message issued by a drive system control electronic control unit (ECU) having second priority; and
log information corresponding to a communication message issued by a body system control electronic control unit (ECU) having third priority.

(10) The information processing apparatus according to (9), in which
the virus monitoring unit
collects only the log information corresponding to the communication message issued by the communication system control electronic control unit (ECU) in a case where the available bandwidth of the data communication network is less than a predetermined first threshold, collects the log information corresponding to the communication messages issued by the communication system control electronic control unit (ECU) and the drive system control electronic control unit (ECU) in a case where the available bandwidth of the data communication network is equal to or larger than the predetermined first threshold but is less than a second threshold, and collects the log information corresponding to the communication messages issued by the communication system control electronic control unit (ECU), the drive system control electronic control unit (ECU), and the body system control electronic control unit (ECU) in a case where the available bandwidth of the data communication network is equal to or larger than the second threshold.

(11) The information processing apparatus according to (9) or (10), in which the log information having the third priority in the priority information further includes log information corresponding to a communication message issued by a probe car compatible sensor system control electronic control unit (ECU).

(12) The information processing apparatus according to any one of (1) to (11), in which:

the data communication network is a data communication network configured to transmit and receive a communication message for controlling a component of a probe car including an information acquisition sensor; and in a case where the available bandwidth of the data communication network is equal to or less than a predetermined sensor compatible threshold, the processing monitoring unit performs control so as to reduce frequency of outputting sensor detection information from the information acquisition sensor to the data communication network.

(13) A moving apparatus including:

a data communication network configured to transmit and receive a communication message for controlling a component of the moving apparatus; and a processing monitoring unit configured to execute processing of monitoring the data communication network, in which:

the processing monitoring unit includes a system load monitoring unit configured to monitor an available bandwidth of the data communication network, and a virus monitoring unit configured to collect log information corresponding to a communication message in the data communication network and perform virus detection based on the log information; and the virus monitoring unit is configured to change a mode of collecting the log information in accordance with information regarding the available bandwidth of the data communication network acquired by the system load monitoring unit, and in a case where the available bandwidth of the data communication network is neither equal to nor larger than a predetermined threshold, collects only limited log information corresponding to a high-priority communication message in accordance with predetermined priority information.

(14) The moving apparatus according to (13), in which in a case where the available bandwidth of the data communication network is equal to or larger than the predetermined threshold, the virus monitoring unit collects not only the log information corresponding to the high-priority communication message but also log information corresponding to a low-priority communication message.

(15) The moving apparatus according to (13) or (14), in which in a case where a virus is detected from the data communication network and the available bandwidth of the data communication network is neither equal to nor larger than the predetermined threshold, the virus monitoring unit collects at least log information corresponding to a communication message issued by a communication system control electronic control unit (ECU).

(16) The moving apparatus according to any one of (13) to (15), in which:

the data communication network is a controller area network (CAN) configured to transmit and receive a communication message for controlling a component of the moving apparatus; and the priority information applied by the virus monitoring unit to determine log information to be collected is priority information set for each electronic control unit (ECU) connected to the CAN.

(17) The moving apparatus according to any one of (13) to (16), in which the priority information is priority information set as follows:

log information corresponding to a communication message issued by the communication system control electronic control unit (ECU) having first priority;

log information corresponding to a communication message issued by a drive system control electronic control unit (ECU) having second priority; and log information corresponding to a communication message issued by a body system control electronic control unit (ECU) having third priority.

(18) The moving apparatus according to (17), in which the log information having the third priority in the priority information further includes log information corresponding to a communication message issued by a probe car compatible sensor system control electronic control unit (ECU).

(19) An information processing method executed in an information processing apparatus, the method including causing a processing monitoring unit configured to execute processing of monitoring a data communication network to execute system load monitoring processing of monitoring an available bandwidth of the data communication network, and virus monitoring processing of collecting log information corresponding to a communication message in the data communication network and performing virus detection based on the log information, in which in the virus monitoring processing, the processing monitoring unit executes processing of changing a mode of collecting the log information in accordance with information regarding the available bandwidth of the data communication network acquired by the system load monitoring unit, and in a case where the available bandwidth of the data communication network is neither equal to nor larger than a predetermined threshold, the processing monitoring unit collects only limited log information corresponding to a high-priority communication message in accordance with predetermined priority information.

(20) A program for causing an information processing apparatus to execute information processing, the program causing a processing monitoring unit configured to execute processing of monitoring a data communication network to execute system load monitoring processing of monitoring an available bandwidth of the data communication network, and virus monitoring processing of collecting log information corresponding to a communication message in the data communication network and performing virus detection based on the log information, in which in the virus monitoring processing, the program causes the processing monitoring unit to execute processing of changing a mode of collecting the log information in accordance with information regarding the available bandwidth of the data communication network acquired by the system load monitoring unit, and in a case where the available bandwidth of the data communication network is neither equal to nor larger than a predetermined threshold, collect only limited log information corresponding to a high-priority communication message in accordance with predetermined priority information.

Further, the series of processing described in the specification can be executed by hardware, software, or a combined configuration of both. In a case where the processing is executed by software, the processing can be executed by installing a program in which the processing sequence is recorded in a memory inside a computer incorporated into dedicated hardware and executing the program, or by installing a program in a general purpose computer that can execute various kinds of processing and executing the program. For example, the program can be recorded on a recording medium in advance. The program can be installed in the computer from the recording medium, or can also be received via a network such as a local area network (LAN) or the Internet and be installed in a recording medium such as a built-in hard disk.

Note that the various kinds of processing described in the specification not only are executed in time series in accordance with the description, but also are executed in parallel or individually depending on a processing capacity of an apparatus that executes the processing or as necessary. Further, in this specification, a system is a logical set configuration of a plurality of apparatuses, and is not limited to a configuration in which apparatuses having respective configurations are included in the same housing.

INDUSTRIAL APPLICABILITY

Hereinabove, as described above, according to a configuration of an embodiment of the present disclosure, efficient virus detection and removal are realized by changing a mode of collecting logs in accordance with a network usage status.

Specifically, for example, the configuration includes a processing monitoring unit that executes processing of monitoring a data communication network, and the processing monitoring unit includes a system load monitoring unit that monitors an available bandwidth of a network and a virus monitoring unit that collects log information corresponding to a communication message and performs virus detection. The virus monitoring unit changes a mode of collecting log information in accordance with information regarding the available bandwidth of the network acquired by the system load monitoring unit. In a case where a virus is detected and the available bandwidth is neither equal to nor larger than a predetermined threshold, only limited log information corresponding to a high-priority communication message is collected.

With this configuration, efficient virus detection and removal are realized by changing the mode of collecting logs in accordance with the network usage status.

REFERENCE SIGNS LIST

10 Moving apparatus
11 Steering
12 Shift lever
13 Display unit
14 Engine
15 Accelerator
16 Brake
17 Processing monitoring unit
18 In-vehicle electronic device group (ECU)
19 GPS receiver
20 Storage unit
21 Communication unit
22 Input/output IF
25 Forward-facing camera
26 Backward-facing camera
27 Omnidirectional camera
30 GPS satellite
100 Moving apparatus
101 Processing monitoring unit
102, 103, 106 ECU
104 Communication unit
105 Virus DB
111 to 114 ECU
115 Sensor detection information DB
120 CAN network
200 ECU
201 CPU
202 ROM
203 RAM
206 Network IF
207 Input/output unit
208 Storage unit
209 Communication unit
300 Information processing apparatus
301 CPU
302 ROM
303 RAM
304 Bus
305 Input/output interface
306 Input unit
307 Output unit
308 Storage unit
309 Communication unit
310 Drive
311 Removable medium
321 Network IF

The invention claimed is:

1. An information processing apparatus, comprising:
a central processing unit (CPU) configured to:
monitor an available bandwidth of a data communication network;
collect log information corresponding to a communication message in the data communication network;
perform virus detection based on the log information;
determine whether the available bandwidth of the data communication network is less than a threshold bandwidth;
change a mode of the collection of the log information based on the determination that the available bandwidth of the data communication network is less than the threshold bandwidth; and collect, based on the changed mode, limited log information corresponding to a high-priority communication message in accordance with determined priority information.

2. The information processing apparatus according to claim 1, wherein
in a case where the available bandwidth of the data communication network is equal to or larger than the threshold bandwidth, the CPU is configured to collect both the limited log information corresponding to the high-priority communication message and log information corresponding to a low-priority communication message.

3. The information processing apparatus according to claim 1, wherein
in a case where a virus is detected from the data communication network based on the virus detection, and the available bandwidth of the data communication network is equal to or larger than the threshold bandwidth, the CPU is further configured to collect both the limited log information corresponding to the high-priority communication message and log information corresponding to a low-priority communication message.

4. The information processing apparatus according to claim 1, wherein the CPU is further configured to transmit the collected log information to a log analysis server.

5. The information processing apparatus according to claim 1, wherein
in a case where a virus is detected from the data communication network based on the virus detection, and the available bandwidth of the data communication network is less than the threshold bandwidth, the CPU is further configured to collect at least log information corresponding to a communication message issued by a communication system control electronic control unit (ECU).

6. The information processing apparatus according to claim 1, wherein the CPU is further configured to:
store the determined priority information regarding log collection in a storage device, and
in a case where a virus is detected from the data communication network based on the virus detection, and the available bandwidth of the data communication network is less than the threshold bandwidth, determine specific log information to be collected in accordance with order of priority obtained from the determined priority information stored in the storage device.

7. The information processing apparatus according to claim 1, wherein the data communication network is a controller area network (CAN) configured to transmit and receive the communication message to control component of a moving apparatus associated with the information processing apparatus.

8. The information processing apparatus according to claim 1, wherein
the determined priority information applicable to determine the log information to be collected includes priority information set for each electronic control unit (ECU) connected to the data communication network.

9. The information processing apparatus according to claim 1, wherein
the determined priority information is set as follows:
first log information corresponding to a communication message issued by a communication system control electronic control unit (ECU) having first priority;
second log information corresponding to a communication message issued by a drive system control ECU having second priority; and
third log information corresponding to a communication message issued by a body system control ECU having third priority.

10. The information processing apparatus according to claim 9, wherein the CPU is further configured to:
collect the first log information corresponding to the communication message issued by the communication system control ECU in a case where the available bandwidth of the data communication network is less than a first threshold,
collect both the first log information and the second log information in a case where the available bandwidth of the data communication network is equal to or larger than the first threshold but is less than a second threshold, and
collect the first log information, the second log information and the third log information in a case where the available bandwidth of the data communication network is equal to or larger than the second threshold.

11. The information processing apparatus according to claim 9, wherein the third log information having the third priority in the determined priority information further includes specific log information corresponding to a communication message issued by a probe car compatible sensor system control ECU.

12. The information processing apparatus according to claim 1, wherein:
the data communication network is configured to transmit and receive the communication message to control component of a probe car including an information acquisition sensor; and
in a case where the available bandwidth of the data communication network is equal to or less than a sensor compatible threshold, the CPU is further configured to reduce frequency of output of sensor detection information from the information acquisition sensor to the data communication network.

13. A moving apparatus, comprising:
a data communication network configured to transmit and receive a communication message to control a component of the moving apparatus; and
a central processing unit (CPU) configured to:
monitor an available bandwidth of the data communication network;
collect log information corresponding to the communication message in the data communication network;
perform virus detection based on the log information;
determine whether the available bandwidth of the data communication network is less than a threshold bandwidth;
change a mode of the collection of the log information based on the determination that the available bandwidth of the data communication network is less than the threshold bandwidth; and
collect, based on the changed mode, limited log information corresponding to a high-priority communication message in accordance with determined priority information.

14. The moving apparatus according to claim 13, wherein
in a case where the available bandwidth of the data communication network is equal to or larger than the threshold bandwidth, the CPU is configured to collect both the limited log information corresponding to the high-priority communication message and log information corresponding to a low-priority communication message.

15. The moving apparatus according to claim 13, wherein in a case where a virus is detected from the data communication network based on the virus detection, and the available bandwidth of the data communication network is less than the threshold bandwidth, the CPU is further configured to collect at least log information corresponding to a communication message issued by a communication system control electronic control unit (ECU).

16. The moving apparatus according to claim 13, wherein:
the data communication network is a controller area network (CAN) configured to transmit and receive the communication message to control the component of the moving apparatus,
the determined priority information applicable to determine the log information to be collected includes priority information set for each electronic control unit (ECU) connected to the CAN.

17. The moving apparatus according to claim 13, wherein the determined priority information is set as follows:
first log information corresponding to a communication message issued by a communication system control electronic control unit (ECU) having first priority;
second log information corresponding to a communication message issued by a drive system control electronic control unit (ECU) having second priority; and
third log information corresponding to a communication message issued by a body system control electronic control unit (ECU) having third priority.

18. The moving apparatus according to claim 17, wherein the third log information having the third priority in the determined priority information further includes specific log information corresponding to a communication message issued by a probe car compatible sensor system control ECU.

19. An information processing method, comprising:
in an information processing apparatus:
monitoring an available bandwidth of a data communication network;
collecting log information corresponding to a communication message in the data communication network;
performing virus detection based on the log information;
determining whether the available bandwidth of the data communication network is less than a threshold bandwidth;
changing a mode of collecting the log information based on the determination that the available bandwidth of the data communication network is less than the threshold bandwidth; and
collecting, based on the changed mode, limited log information corresponding to a high-priority communication message in accordance with determined priority information.

20. A non-transitory computer-readable medium having stored thereon, computer-executable instructions which, when executed by a computer, cause the computer to execute operations, the operations comprising:
monitoring an available bandwidth of a data communication network;
collecting log information corresponding to a communication message in the data communication network;
performing virus detection based on the log information;
determining whether the available bandwidth of the data communication network is less than a threshold bandwidth;
changing a mode of collecting the log information based on the determination that the available bandwidth of the data communication network is less than the threshold bandwidth; and
collecting, based on the changed mode, limited log information corresponding to a high-priority communication message in accordance with determined priority information.

* * * * *